US012022921B2

(12) United States Patent
Teissl et al.

(10) Patent No.: US 12,022,921 B2
(45) Date of Patent: Jul. 2, 2024

(54) DECORATIVE STRUCTURE

(71) Applicant: D. Swarovski KG, Wattens (AT)

(72) Inventors: Christian Teissl, Innsbruck (AT); Christof Neuhauser, Innsbruck (AT); Guenther Blasbichler, Innsbruck (AT); Markus Sauer, Mils (AT)

(73) Assignee: D. Swarovski KG, Wattens (AT)

( * ) Notice: Subject to any disclaimer, the term of this patent is extended or adjusted under 35 U.S.C. 154(b) by 71 days.

(21) Appl. No.: 17/597,608

(22) PCT Filed: Jul. 17, 2020

(86) PCT No.: PCT/EP2020/070390
§ 371 (c)(1),
(2) Date: Jan. 13, 2022

(87) PCT Pub. No.: WO2021/009381
PCT Pub. Date: Jan. 21, 2021

(65) Prior Publication Data

US 2022/0287421 A1 Sep. 15, 2022

(30) Foreign Application Priority Data

Jul. 17, 2019 (EP) .................................... 19186834

(51) Int. Cl.
*A44C 17/00* (2006.01)
*A44C 27/00* (2006.01)
(Continued)

(52) U.S. Cl.
CPC ............ *A44C 17/001* (2013.01); *A44C 27/00* (2013.01); *B44C 1/24* (2013.01); *B44F 1/02* (2013.01)

(58) Field of Classification Search
CPC ......... A44C 17/001; A44C 27/00; B44C 1/24; B44F 1/02
See application file for complete search history.

(56) References Cited

U.S. PATENT DOCUMENTS 7,755,860 B2 * 7/2010 Chang .................... G02B 5/124 359/834
8,270,079 B1 9/2012 Mossberg et al.
(Continued)

FOREIGN PATENT DOCUMENTS

CN 207851338 U 9/2018
CN 208359648 U 1/2019
(Continued)

OTHER PUBLICATIONS

Robert Thielgen; Extended European Search Report; European Application No. 19186834; Jan. 16, 2020; European Patent Office; Munich, Germany.
(Continued)

*Primary Examiner* — Jack W Lavinder
(74) *Attorney, Agent, or Firm* — Stevens & Showalter LLP

(57) ABSTRACT

A decorative structure (20) comprising a planar support (22) and a faceted microstructure (24) on at least one side of the planar support (22) is provided. The decorative structure (20) may further comprise an at least partially reflective layer (26) configured to at least partially reflect light that passes through the microstructure (24). The faceted microstructure (24) comprises a plurality of grooves (28) creating a pattern of facets (30) over the surface of the support (22), such that the microstructure (24) is capable of splitting incident light into spectral colours. In embodiments, the grooves (28) have a triangular or V-shaped profile. Methods of making a decorative structure(20) and articles incorporating the decorative structure (20) are also described.

18 Claims, 12 Drawing Sheets

(51) Int. Cl.

| | |
|---|---|
| ***B44C 1/00*** | (2006.01) |
| ***B44C 1/24*** | (2006.01) |
| ***B44F 1/02*** | (2006.01) |

(56) References Cited

U.S. PATENT DOCUMENTS

| | | | |
|---|---|---|---|
| 2005/0141243 | A1 | 6/2005 | Mullen et al. |
| 2009/0244739 | A1 | 10/2009 | Chang |
| 2015/0276998 | A1 | 10/2015 | Miller et al. |
| 2016/0325535 | A1 | 11/2016 | Ueno et al. |
| 2016/0327708 | A1 | 11/2016 | Liles et al. |

FOREIGN PATENT DOCUMENTS

| | | | |
|---|---|---|---|
| DE | 2012636 | U1 | 11/2006 |
| DE | 102011015141 | A1 | 9/2012 |
| TW | M567487 | U | 9/2018 |
| WO | 2021009381 | A1 | 1/2021 |

OTHER PUBLICATIONS

Giuseppe Di Miceli; International Search Report and Written Opinion; International Application No. PCT/EP2020/070390; Oct. 22, 2020; European Patent Office; Rijswijk, Netherlands.

Rejection Decision dated Jan. 28, 2023; Chinese Application No. 2020800517346; China National Intellectual Property Administration; Beijing, China.

Notification of First Office Action dated Aug. 29, 2022; Chinese Application No. 2020800517346; China National Intellectual Property Administration; Beijing, China.

Search Report dated Aug. 23, 2022; Chinese Application No. 2020800517346; China National Intellectual Property Administration; Beijing, China.

* cited by examiner

DECORATIVE STRUCTURE

FIELD OF THE INVENTION

The invention relates to a decorative structure comprising a support, a faceted microstructure and optionally a reflective or partially reflective layer configured to reflect at least some of the light that is incident on and/or passes through the microstructure. In particular, the microstructure comprises a plurality of grooves creating a continuous pattern of facets. A method of making a decorative structure, and a curable resin composition suitable for making microstructures are also provided.

BACKGROUND

Faceted transparent decorative components such as crystals or gemstones have been used to embellish products for a long time. Conventional gemstones are usually grinded and polished by means of grinding wheels or rollers to obtain a convex outer shape. As shown on FIGS. 1A, B, and C, typical gemstones 1 have a complex geometry comprising an upper part (crown 2) and a lower part (pavilion 3), each comprising a plurality of facets 2*a*, 3*a*. The crown 2 typically further comprises a planar top face, the table 2*b*, from which the crown facets 2*a* extend towards a girdle 4. The pavilion 3 may similarly comprise a flat section, the cullet 3*b*, from which the pavilion facets 3*a* extend towards the girdle 4. This type of faceted geometry is optimised to create desirable optical effects that are typically associated with a gemstone. In particular, the characteristics of the light reflections generated by a gemstone cut have been characterised by the Gemological Institute of America (GIA) as the "brilliance" of the cut, which combines three aspects: fire, light return and scintillation (Thomas M. Moses, et al.: *A Foundation for Grading The Overall Cut Quality of Round Brilliant Cut Diamonds*, Gems & Gemology, Fall 2004, https://www.gia.edu/gems-gemology/fall-2004-grading-cut-quality-brilliant-diamond-moses. The fire of a cut refers to the appearance, or extent, of light dispersed into spectral colours seen in a polished gemstone when viewed face-up (i.e. when looking at the crown of the gemstone). The light return (or "brightness") of a cut refers to the appearance, or extent, of internal and external reflections of "white" light seen in a polished gemstone when viewed face-up. The scintillation of a cut refers to the appearance, or extent, of spots of light seen in a polished gemstone when viewed face-up that flash as the gemstone, observer, or light source moves (sparkle); and the relative size, arrangement, and contrast of bright and dark areas that result from internal and external reflections seen in a polished gemstone when viewed face-up while that gemstone is still or moving (pattern).

While these optical properties are highly desirable, there are many disadvantages associated with the gemstones of the prior art, primarily due to the fact that the geometries required to obtain these properties have a height (crown +pavilion) in the order of magnitude of the diameter of the gemstone. In particular, such voluminous gemstones cannot easily be glued on materials such as textiles, for which gemstones without a pavilion (also referred to as "flat backs") are typically used, which have limited brilliance. Further, embedding gemstones in polymers can also be problematic due to the creation of air bubbles around the pavilion, degrading the appearance of the product. Additionally, gemstones that are cut according to the prior art typically display large dimensional variations, such as in the order of about 5-10% of the diameter of the stone. This may be particularly problematic when covering a surface with gemstones as the surface of the product may as a result have a highly variable profile. Further, prior art gemstones are not practical in many applications that are associated with a limited installation depth (for example, paper and packaging industry, credit cards, watches, mobile electronic devices).

Finally, for applications that require covering a surface with gemstones, the additional weight associated with the presence of the gemstones may be disadvantageous, and the costs may be prohibitive. For example, covering a surface with 3.4 mm wide randomly arranged crystals may be associated with a weight of about 3 kg/m$^2$ and covering a surface with randomly arranged approx. 1 mm wide crystals may still be associated with weights of about 1.13 kg/m$^2$. Additionally, while very small stones (such as e.g. 1 mm diameter stones) may alleviate some of the above problems, they are still relatively heavy, and are comparatively costly to produce.

It is against this background that the invention has been devised.

SUMMARY OF THE INVENTION

In a first aspect, the invention resides in a decorative structure comprising a support having a first planar major surface and a second planar major surface opposite the first planar major surface, a microstructure on the first planar major surface of the support. The microstructure comprises a plurality of grooves creating a continuous pattern of facets, such that the facets are capable of splitting incident light into spectral colours. In embodiments, the pattern of facets comprises at least two different types of facets. The different types of facets may differ from each other by their geometry and/or the angle of the facet plane relative to the planar major surface of the support. Advantageously, the presence of different types of facets may produce more interesting optical effects including reflection and refraction at different angles, and possibly at different angles depending on the wavelength of the light, thereby generating fire.

Within the context of the invention, facets are substantially planar surfaces of any geometry that are adjacent to each other and meet at sharp edges, in a similar manner as the cut sides of a gemstone.

In particularly preferred embodiments, the decorative structure comprises: an at least partially reflective layer configured to at least partially reflect light that is incident on or passes through the surface of the facets; and two or more superimposed microstructures.

Alternatively, it is envisaged that the decorative structure may comprise only one of (i) an at least partially reflective layer configured to at least partially reflect light that is incident on or passes through the surface of the facets; and (ii) two or more superimposed microstructures.

The present inventors have surprisingly discovered that a microstructure could be provided on a planar surface, which especially when combined with a reflective or partially reflective layer, results in a decorative structure that presents optical characteristics comparable to those of decorative crystal components, i.e. maintaining their aesthetic functionality (e.g. aesthetically pleasing optical properties in daylight conditions) while having much lower weight and thickness and being more time and cost effective to produce.

Advantageously, the use of two or more superimposed geometries may enable to create more complex and unexpected optical effects when the object is moved, similar to the "sparkle" of a gemstone. Further, the use of superimposed geometries may "dilute" the appearance of the grooves forming the microstructures, thereby generating a more uniform "random-looking" appearance of facets. In preferred embodiments, in which the decorative structure comprises an at least partially reflective layer and two or more superimposed microstructures, there is a synergy between the superimposed geometries, or facet patterns, and the reflective or partially reflective layer. The combination of superimposed geometries with a reflective or partially reflective layer may beneficially result in unexpected light reflections and optical effects for a viewer, providing a decorative structure having a visual appearance and optical properties particularly closely comparable to those of a decorative crystal component or gemstone.

The decorative structures according to the invention provide many advantages compared to conventional gemstones. In particular, they may have a low installation depth (in the order of one to a few hundred microns, not including the support. Further, the depth of the structures may advantageously be independent from the dimension of the unit in the pattern of facets chosen, and may be constant (or less variable than comparative traditional gemstones) over the structure. Additionally, they may be more amenable to combination with composites (e.g. embedding in plastic materials) as they may not suffer from problems associated with the appearance of bubbles around the pavilion of conventional gemstones. Further, they may be conveniently applied to textiles due to their comparatively low weight and microscopically flat surface. Additionally, they may be comparatively cheaper to produce than very small gemstones.

In embodiments, the grooves are formed from substantially straight and elongate lines that extend over at least a part of the microstructure.

In embodiments, the grooves are substantially triangular grooves and are e.g. substantially V-shaped. Substantially triangular grooves within the context of the invention may be interpreted to mean that the grooves comprise two walls inclined relative to the major surface of the support, the walls meeting at an apex or a narrow flat base. Where the groove comprises a narrow flat base the groove may be considered to have a generally U-shaped profile.

In embodiments, the grooves may be formed from two walls inclined relative to the major surface of the support, the walls meeting at an apex or a narrow flat base. In embodiments, the grooves may comprise a triangular lower portion and upper portion extending at an angle from the walls of the triangular portion, such that one or both side walls comprises two angular planes/two facet angles that meet at a straight edge/line junction.

In embodiments, the microstructure comprises a plurality of grooves creating a continuous pattern of facets. A continuous pattern of facets may comprise a collection of substantially flat surfaces that are adjacent to each other and meet at vertices and edges. In embodiments, the continuous pattern of facets may comprise only triangular facets. In other embodiments, the continuous pattern of facets may comprise triangular and non-triangular facets. When non triangular facets are used, these may optionally be parallel to the first planar major surface.

In embodiments, some or all of the facets are defined by the walls of the grooves and the angle of incline of one of the walls defines a different facet plane angle compared to the other wall(s) of the groove.

In embodiments, the grooves have a depth of between 30 μm and 3,000 μm, preferably between 30 μm and 1,000 μm, between 30 μm and 500 μm, or between 30 μm 200 μm.

In embodiments, the plurality of grooves has a depth of between 30 μm and 200 μm. Advantageously, this range of depth of grooves may enable to create inclined facets that have angles sufficiently high to create optical effects of interest such as fire and scintillation, while maintaining a size of facets that is sufficiently high to be distinguishable by the naked eye. Without wishing to be bound by theory, it is believed that the ability to distinguish facets with the naked eye is lost when the facets are smaller than about 300 μm at their widest point, thereby reducing the "gemstone-like" appearance of the structure. In preferred embodiments, the triangular grooves have a depth of between 50 μm and 150 μm. Such depths may be particularly amenable to production by imprint lithography. In embodiments, the triangular grooves have a depth of between 60 μm and 100 μm, such as about 90 μm.

In embodiments, the grooves are substantially straight lines that each extend continuously substantially over the whole of the microstructure. The use of straight lines extending over the whole length of the structure may be advantageous from a manufacturing point of view as it may enable relatively simple machines to be used and relatively fast production processes (since a groove may be created in a single movement of e.g. a cutting tool).

In embodiments, the grooves are substantially straight lines that extend over a part of the microstructure. In other words, the grooves may be formed from one or more line segments arranged at specific angles relative to each other (e.g. grooves may "turn"/comprise broken lines and may start and finish within the microstructure, and do not necessarily form a single, continuous straight line that extends over the whole microstructure. The use of complex patterns of grooves that do not extend in a continuous straight line over the whole microstructure may advantageously result in more complex geometries that could not be obtained using patterns of intersecting straight lines.

In embodiments, the grooves are substantially straight lines that extend over a part of the microstructure and that together form a triangulation of a set of points.

In embodiments, the at least partially reflective layer is a reflective or a semi-transparent layer. In embodiments, the reflective or semi-transparent layer comprises a layer of metal, preferably silver and/or aluminium, or a plurality of layers of material forming a dielectric mirror.

In embodiments, the at least partially reflective layer is a reflective (also referred to as "mirror" layer. Any mirror coating known in the art may be suitable for use in the present invention. For example, mirror layers comprising a silver, aluminium or rhodium coating may be used. In embodiments, the at least partially reflective layer is a layer of metal, such as e.g. a silver or aluminium layer, with a thickness between about 20 nm and about 1 μm.

In embodiments, the at least partially reflective layer is a reflective layer comprising a metal layer of at least about 150 nm. In embodiments, the at least partially reflective layer is a semi-transparent layer comprising a metal layer with a thickness below 100 nm, such as e.g. around 50 nm.

In embodiments, the at least partially reflective layer comprises one or more interference layers. Interference layers may advantageously be used to generate interesting optical patterns, such as colourful bands, by interaction with light incident on the layer.

In embodiments, the at least partially reflective layer comprises one or more absorbing layers. Absorbing layers may be configured to filter light passing through the layer, which filtering can be wavelength dependent, thereby resulting in colour filtering effects.

In embodiments, the grooves comprise two planar walls, and the angle between each of the planar walls of the grooves and the planar surface of the support are individually selected from between 5 and 35°. In embodiments, the grooves are substantially triangular, and/or wherein the two planar walls meet at an apex (or straight edge).

In embodiments, the angles between each of the planar walls and the planar surface of the support are individually selected between 5° and 25°, preferably between 5° and 15°. In embodiments, the angles between each of the planar walls and the planar surface of the support are at most 25°, at most 20°, or at most 17.5°.

Angles in those ranges may advantageously enable the structure to have acceptable fire while maintaining a size of the facets that are formed from the walls of the grooves such that these are visible with the naked eye, without exceeding depths of about 150 μm.

In embodiments, the facets of the microstructure have a width of at least 300 μm, wherein the width refers to the length of the diameter of the smallest circle that would fit the geometry of the facet. In preferred embodiments, the facets of the microstructure have a width of at least 350 μm.

Advantageously, facets with sizes as above or higher may be distinguishable by the naked eye, thereby contributing to the "gem-like" visual impression of the decorative structure.

In embodiments, all of the facets of the microstructure are formed from the walls of the grooves. In other embodiments, additional facets are present which are parallel to the first planar major surface of the support. Advantageously, the combination of facets formed from the walls of the groove and facets parallel to the first planar major surface of the support may result in a microstructure that has a geometry similar to that of the crown of a gemstone, with a flat table surrounded by inclined facets.

In embodiments where facets are present which are parallel to the first planar major surface of the support, facets formed from the walls of the grooves (i.e. facets that are inclined relative to the planar major surface of the support) advantageously cover an area of the microstructure that is 3, 4, 10, 20, 50, 100, or 140 times larger than the area covered by facets that are parallel to the first planar surface of the support. In other words, the area obtained by projection of the inclined facets of the microstructure onto the first planar surface of the support is at least 3, 4, 10, 20, 50, 100, or 140 times larger than the area obtained by projection of the parallel facets of the microstructure onto the first planar surface of the support.

While the use of facets parallel to the first major surface of the support may contribute to generating a "gem-like" appearance (i.e. by obtaining a geometry similar to that of the crown of a classically cut gemstone), such facets do not generate optical effects that are as complex as those generated by inclined facets. As such, excessive areas covered by parallel facets may have a negative effect on the optical properties of the decorative structure, which may appear more "dull".

In embodiments, at least some of the grooves comprise or are formed from a first planar wall and a second planar wall, wherein the angle between the first planar wall and the planar surface of the substrate is different to the angle between the second planar wall and the planar surface of the substrate.

Advantageously, the use of different angles on either side of the groove may enable to increase the visual complexity of the decorative structure, thereby increasing the "gem-like" visual appearance of the decorative structure.

In embodiments, the facets of the microstructure are planar surfaces with low surface roughness and a high degree of flatness. In the context of the present disclosure, a surface may be considered to have low surface roughness if it has a Ra<100 nm, where Ra is the arithmetic mean deviation of the surface profile, as known in the art.

In the context of the present disclosure, a surface may be considered as having a high degree of flatness (also referred to as low waviness), if it has a flatness deviation df below 2 μm, where the flatness deviation is the maximum deviation from the intended plane of a surface.

In preferred embodiments, the facets of the microstructure have a surface roughness Ra below about 50 nm, below about 20 nm, below about 10 nm, or below about 5 nm. In preferred embodiments, the facets of the microstructure have a flatness deviation df below 1 μm, below 800 nm, below 500 nm or below 200 nm.

Without wishing to be bound by theory, it is believed that surface roughness above the above ranges may negatively impact the brilliance of the resulting microstructure and/or the fire of the resulting microstructure, due to the appearance of stray light rather than predictable consistent patterns of reflection and diffraction. Similarly, it is believed that high levels of flatness deviation may negatively impact the brilliance and/or fire of the resulting microstructure.

In embodiments, the plurality of grooves comprises a first set of parallel grooves and a second set of parallel grooves that at least partially intersects with the first set of parallel grooves. In embodiments, the plurality of grooves comprises a third set of parallel grooves that at least partially intersects with the first and second sets of parallel grooves.

In embodiments, the first and second set of parallel grooves intersect at an angle of about 90°. In such embodiments, the two sets of grooves may form a two-fold symmetrical pattern of facets.

In embodiments, the first and second set of parallel grooves are not perpendicular. In such embodiments, the two sets of grooves may form an asymmetrical two-fold pattern of facets. In some such embodiments, the first and second set of parallel grooves interest at an angle of about 120°. Two-fold asymmetrical patterns may be advantageous because it may result in larger facets compared to a corresponding symmetrical pattern, with similarly spaced grooves, and higher visual complexity. Two fold symmetrical patterns on the other hand may be advantageous because they do not result in large angular regions without reflection of light upon a mirror layer when present in the structure.

In embodiments, the first, second and third set of parallel grooves intersect at angles of about 120°. In such embodiments, the three sets of parallel grooves may form a three-fold symmetrical pattern of facets.

Advantageously, such geometries may represent a good compromise between the properties of fire, redirection angles of incident light and facet size.

In embodiments, all of the parallel grooves in each set are formed from two planar walls that meet at an apex, and where the angles between each of the planar walls and the planar surface of the support are the same for all parallel grooves in the set.

In embodiments, the grooves within each set of parallel grooves are each spaced from the adjacent groove in the same set by approximately the same distance. Advantageously, the use of equidistant grooves within each set may ensure that the sizes of the facets are approximately constant across the microstructure.

In other embodiments, the grooves within each set of parallel grooves are spaced form each other by randomly selected distances. This may increase the complexity of the visual impression generated by the structure, by increasing the "unpredictability" of the visual impression and thereby increasing the "gem-like" appearance of the structure.

In embodiments, the microstructure is formed from a layer of material applied on the support.

In embodiments, the microstructure is formed from a layer of material that is applied to or otherwise bonded to the support prior to or after formation of the microstructure. Advantageously, the use of a layer of material distinct from the support to form the microstructure may enable an increase in flexibility in the choice of material of the support, which may then be selected for example according to the intended use of the decorative structure.

In embodiments, the microstructure and the support are integrally made. In such embodiments, the first planar surface may be internal to the integral structure formed by the support and microstructure. For example, the microstructure and support may be formed by moulding, such as by injection moulding, as a single integral structure.

In embodiments, the microstructure is formed by imprinting the support or a layer or material applied on the support, such as by imprint lithography.

In embodiments, the microstructure is formed by moulding, such as e.g. injection moulding, thermoforming, or casting.

In embodiments, the microstructure may be formed by providing a microstructured reflective sheet and combining this with the support by providing a material between the reflective sheet and the support, the material forming the microstructure by conforming to the microstructure in the reflective sheet. In some such embodiments, the reflective sheet may be a metal mirror sheet. In some such embodiments, the metal mirror sheet may be microstructured by any method known in the art, for example by deep drawing.

In embodiments, the support is made from a transparent material. Within the context of the present invention, a material is called transparent if it allows the transmission of light, preferably at least visible light. Preferably, the material is transparent in the conventional sense, i.e. allowing (at least visible) light to pass through the material without being scattered.

In embodiments, the support is made from a material selected from glass, such as crystal glass, ultrathin glass, chemically strengthened glass (such as e.g. Gorilla® Glass from Corning®), or an organic polymer such as PET (polyethylene terephthalate), PMMA (poly(methyl methacrylate)), or PE (polyethylene). As the skilled person would understand, the support may be made from a composite material comprising one or more materials selected from the above list, such as for example one or more layers of glass and/or one or more layers of polymers. For example, the support may be a safety glass panel comprising two layers of glass separated by a layer of transparent elastomeric material.

In embodiments, the support is a substantially flat structure, such as e.g. a panel, sheet or film of material. In embodiments, the support is a flexible film of material.

In embodiments, the support is a film made from an organic polymer such as PET, PMMA or PE. In some such embodiments, the film has a thickness of at most 2 mm, preferably at most 1 mm, or at most 500 μm. In embodiments, the film has a thickness between about 100 μm and about 500 μm, or between about 100 μm and about 200 μm, such as about 125 μm. In some embodiments, the decorative structure may have a weight below 1 $kg/m^2$, preferably below 500 $g/m^2$, such as about 250 $g/m^2$.

Lightweight films may advantageously be applied on large surfaces and/or light articles without negatively impacting the properties of the articles to which the film is applied.

In embodiments in which the decorative structure comprises two or more superimposed microstructures, the two or more microstructures are optionally separated from each other by the support and/or an at least partially reflective layer. The at least partially reflective layer may be an at least partially reflective layer according to any one or more of the embodiments described above. In the context of this invention, the term "superimposed" refers to the two microstructures having main planes that are parallel to each other.

In embodiments, the decorative structure comprises two superimposed microstructures separated from each other by the support and/or an at least partially reflective layer.

In embodiments, the decorative structure comprises a single microstructure on the first planar major surface of the support, and a single microstructure on the second planar major surface of the support. In such embodiments, the decorative structure may further comprise a semi-transparent (i.e. partially reflective) layer between the first and/or the second planar major surface of the support and the first and/or second microstructure (as the case may be). In such embodiments, the decorative structure may comprise, instead or in addition to a semi-transparent layer, a reflective layer on the exposed surface of the first or the second microstructure.

In embodiments, the decorative structure comprises a first microstructure on the first planar major surface of the support, and a second microstructure on the first microstructure on the first planar major surface of the support. In such embodiments, the decorative structure furthers comprise a semi-transparent (i.e.

partially reflective) layer between the first and the second microstructures. In such embodiments, the decorative structure may additionally comprise a reflective layer between the first planar major surface of the support and the first microstructure, or on the second planar major surface of the support.

In preferred embodiments, the two superimposed microstructures have different geometries or similar geometries that are superimposed such that the two microstructures are not aligned when viewed perpendicular to the main planes of the microstructures. In some such embodiments, the two microstructures have similar geometries that are rotated relative to each other.

In embodiments, the two microstructures have different geometries that have the same fold symmetry. For example, the two microstructures may both have two-fold or three-fold symmetry.

In embodiments where the two microstructures have similar geometries or the same fold symmetry, the two microstructures may be rotated relative to each other by an angle that is not a rotational angle of symmetry of the microstructures. For example, when the microstructures have two-fold symmetry, the two microstructures may be rotated relative to each other by an angle that is not 90 or 180°. Similarly, when the microstructures have three-fold symmetry, the two microstructures may be rotated relative to each other by an angle that is not 60, 120 or 180°.

In embodiments, the two microstructures may be rotated relative to each other by an angle of about 25°.

Advantageously, the use of different geometries or similar geometries that are not aligned increase the complexity of the geometric pattern created by the decorative structure, thereby increasing the "gem-like" appearance of the decorative structure.

In embodiments where the two microstructures are separated by the at least partially reflective layer, the at least partially reflective layer is advantageously a semi-transparent layer.

In embodiments where the two microstructures are separated by the support, the at least partially reflective layer may be provided on the surface of one of the microstructures. In such embodiments, the at least partially reflective layer may be a mirror layer.

In embodiments where the microstructures are separated by the support and the at least partially reflective layer, the at least partially reflective layer may be a semi-transparent layer. In some such embodiments, the structure may further comprise an additional at least partially reflective layer, preferably a mirror layer, on the surface of one of the microstructures.

In embodiments, the two microstructures and the support are integrally made. In such embodiments, the first and second planar surfaces may be internal to the integral structure formed by the support and microstructures.

In embodiments, the microstructure is made from a transparent material. Advantageously, the use of a transparent material enables visible light to travel through the material of the microstructure such that it can be at least partially reflected by the at least partially reflective layer, where the combination of faceting and reflection results in patterns of refraction that are similar to those created by a gemstone.

In embodiments, the decorative structure further comprises a decorative coating applied on at least a region of the microstructure. Any decorative coating that is at least semi-transparent may be used in the present invention.

In embodiments, a decorative coating may be configured to give a coloured appearance to the region of the microstructure on which it is applied.

Colouring and decorative coatings may enable the decorative element to be provided with a variety of decorative effects, improving their flexibility of use.

In embodiments, a decorative coating may be configured to provide a complex decorative optical effect on the region of the microstructure on which it is applied In embodiments, a decorative coating may comprise a multi-layer interference system that creates a desired optical effect. For example, a decorative coating may comprise alternating layers of $TiO_2$ and $SiO_2$.

In embodiments, a decorative coating may comprise a multi-layer system that creates a desired optical effect by causing a wavelength-specific ratio of transmission and reflection of light. For example, alternating thin layers of $Fe_2O_3$ and Cr may be used.

In embodiments, a decorative coating may comprise a multi-layer system that creates a desired optical effect by causing a wavelength-specific absorption and reflection of visible light such that some wavelengths are intensely reflected while others are absorbed.

The layers of the multi-layer systems described above may be deposited by any PVD or CVD method known in the art, such as e.g. by sputtering.

In embodiments, the support and or the microstructure may be coloured. In some such embodiments, the colouring is provided as a colouring agent throughout the body of the support and/or the microstructure. For example, when the support is made of glass or crystal glass, a colouring can be achieved by introducing metal oxides in the glass. Alternatively or in addition to colouring the material of the support or the microstructure, a colouring may be provided as a coating or other surface treatment on at least a region of the support or the microstructure.

In embodiments, the decorative structure further comprises a backing layer. In such embodiments, the backing layer is typically provided in combination with a reflective layer, on the side of the reflective layer that is opposite from the microstructure(s).

In embodiments, the backing layer comprises a protective layer. In embodiments, the backing layer comprises a protective layer and one or more adhesive layer(s), at least one of the one or more adhesive layers being provided on the side of the backing layer that is exposed in the finished decorative structure.

A protective layer may advantageously protect the decorative structure, and in particular the reflective layer on the decorative structure, from mechanical and/or chemical damage.

In embodiments, the protective layer comprises a layer of lacquer. In embodiments, the layer of lacquer comprises a lacquer selected from the group consisting of: epoxy lacquers, one component polyurethane lacquers, bi-component polyurethane lacquers, acrylic lacquers, UV-curable lacquers, and sol-gel coatings. The lacquer may optionally be pigmented.

In embodiments, the lacquer is applied by spraying, digital printing, rolling, curtain coating or other two-dimensional application methods known in the art. Suitably, the lacquer may be selected so as to be mechanically and chemically robust and bondable.

The lacquer may additionally ensure that the decorative structure according to the invention is bondable. As the skilled person would understand, the choice of a suitable lacquer may depend on the material to which the decorative element is intended to be bonded, and/or on the adhesive that is intended to be used.

In embodiments, the lacquer may be applied with a thickness of between about 4 and 14 μm (i.e. 9 ±5 μm); for example, the lacquer may be applied with a thickness of about 9 μm.

In embodiments, microstructure is made from a material that is non-diffusive. Within the context of the invention, a material may be considered as non-diffusive if it exhibits mostly specular reflection and very little diffusive reflection. Preferably, a non-diffusive material does not exhibit any diffusive reflection. In other words, a material may be considered as non-diffusive if it does not have a milky or turbid appearance due to the scattering of light by the material.

In embodiments, the microstructure is made from a material that has high optical dispersion. In embodiments, the material has an Abbe number below 60. In the context of the present invention, a material may be considered to have high optical dispersion if it shows a high variation of refractive index as a function of wavelength in the visible range. In embodiments, a material with high optical dispersion has a low Abbe number, such as an Abbe number below 60, preferably below 50, below 40 or below 35. Advantageously, the use of a material with high optical dispersion may increase the colour split that occurs when white light interacts with the facets of the structure. This may in turn improve the fire of the structure for a given maximum angle of facets. Without wishing to be bound by theory, it is believed that the fire of the structure is influenced by the optical dispersion of the material of the microstructure as well as the angles of the facets (formed by the walls of the grooves) relative to the plane of the structure. Sharper facets are expected to improve fire, as would higher dispersion. Therefore, a given requirement in terms of fire of the structure may be achievable by balancing these two parameters. For example, in embodiments where shallow facets are preferred (e.g. with angles in the range of approx. 0 to 15° from the planar surface), materials with higher dispersion (Abbe number below 40) may be chosen compared to embodiments using facets at sharper angles (e.g. with angles in the range of approx. 15 to 45° from the planar surface).

The Abbe number of a material may be determined for example by ellipsometry, as known in the art. In particular, the refractive index of the material at multiple wavelengths at least within the visible range may be measured for example using variable angle spectroscopic ellipsometry, and the Abbe number may be calculated as $v=(n_d-1)/(n_F-n_c)$ where $n_d$, $n_F$ and $n_c$ are the refractive indices of the material at the wavelengths of the Fraunhofer d– (He light source), F– (H light source) and C– (H light source) spectral lines (587.56 nm, 486.13 nm and 656.27 nm respectively) or $v=(n_e-1)/(n_{F'}-n_{C'})$ where $n_e$, $n_{F'}$ and $n_{c'}$ are the refractive indices of the material at the wavelengths of the Fraunhofer e– (Hg light source), F'– (Cd light source) and C'– (Cd light source) spectral lines (546.07 nm, 479.99 nm and 643.86 nm respectively).

In embodiments, the microstructure is made from any polymer that is suitable for imprinting, as known in the art. In embodiments, the microstructure is made from a (meth) acrylate based UV curable resin composition. In embodiments, the microstructure is made from hybrid polymers. In embodiments, the microstructure is made from UV-curable or thermally curable paints.

In embodiments, the microstructure is made from a thermosetting material, such as e.g. sol-gel or polycarbonate.

In embodiments, the microstructure is made from a material obtained by curing a UV curable resin composition, the UV curable resin composition comprising acrylate and/or methacrylate monomers, and having a high aromatic content. In the context of the invention, a composition may be considered to have a high aromatic content if the composition has an aromatic content of at least 40%, preferably at least 50%. The aromatic content of a compound or composition may be quantified as the proportion of the carbon atoms in the compound or composition that are part of aromatic rings.

Advantageously, the use of UV curable resin compositions with a high aromatic content may be associated with high refraction indices and high dispersion, compared to commonly used nanoimprint resins. As explained above, this may contribute to increasing the fire of the decorative structure.

In embodiments, the microstructure is made from a material obtained by curing a UV curable resin composition according to any of the embodiments of the following aspect of the invention. In embodiments, the microstructure is made from a material obtained by curing a UV curable resin composition according to any of the embodiments of the following aspect of the invention.

According to a second aspect of the invention, there is provided a UV curable resin composition comprising acrylate and/or methacrylate monomers and a photoinitiator, wherein the composition has an aromatic content of at least 50%.

Advantageously, the use of UV curable resin compositions with a high aromatic content may be associated with high refraction indices and high dispersion, compared to commonly used nanoimprint resins. This may be particularly advantageous for use in creating decorative structures according to the first aspect of the invention, where high dispersion creates desirable optical effects.

In embodiments, the curable resin composition has a viscosity below about 3 Pas. In embodiments, the composition has a viscosity between about 500 mPas and about 3,000 mPas. In embodiments, the curable resin composition has a viscosity between about 500 mPas and about 1,500 mPas, particularly between 500 mPas and 1,000 mPas, such as e.g. between 700 mPas and 1,000 mPas.

In embodiments, the composition comprises methacrylate monomers as a main component. For example, methacrylate monomers may form at least about 90%, at least about 92%, at least about 94%, at least about 96%, at least about 97% or at least about 98% of the curable resin composition by weight. In embodiments, the composition comprises acrylate monomers as a main component. For example, acrylate monomers may form at least about 90%, at least 92%, at least 94%, at least 96% or at least 98% of the curable resin composition.

In embodiments, the resin composition, when cured, results in a polymer material that is transparent. In embodiments, the resin composition, when cured, results in a polymer material that has high optical dispersion. In embodiments, a polymer material with high optical dispersion has a low Abbe number, such as an Abbe number below about 60, preferably below about 50, below about 40 or below about 35.

In embodiments, the photoinitiator is a photoinitiator with a high UV-A absorption coefficient, such as e.g. at least about 200 L/(mol*cm), preferably at least about 400 L/(mol*cm) or at least about 500 L/(mol*cm) at wavelengths between 350 nm and 400 nm. In embodiments, the photoinitiator is a photoinitiator with low absorption in the visible wavelengths, such as e.g. below about 200 L/(mol*cm) at wavelengths between 400 and 700 nm. Preferably, the photoinitiator is liquid at room temperature.

Suitable photoinitiators for use according to the invention include ethyl(2,4,6-trimethylbenzoyl)-phenyl phosphinate (cas no. 84434-11-7, TPO-L, available from IGM); blends of bis(2,6-dimethoexybenzoyl)-2,4,4-trimethyl pentylphosphineoxide and 1-hydroxy-cyclohexyl-phenyl-ketone (such as that available as Genocure LTM); 2,4,6-trimethylbenzoyl-diphenylphosphine oxide (available as Genocure TPO); benzil dimethyl ketal 2,2-methoxy-1,2-diphenyl ethanone (available as Genocure BDK, also available as Irgacure 651); 2-hydroxy-2-methyl-1-phenyl-propan-1-one (available as Genocure DMHA); 1-hydroxycyclohexyl phenyl ketone (available as Irgacure 184); and blends of 1-hydroxycyclohexylphenyl-ketone and benzophenone (such as that available as Additol BCPK).

In embodiments, the photoinitiator is present in a concentration of at most about 3% by weight of the curable resin composition. In embodiments, the photoinitiator is present in a concentration of at least 0.1% by weight of the curable resin composition, preferably between about 0.5 and 3%, such as about 1%, about 1.5% or about 2% of the total weight of the curable resin composition.

In embodiments, the (meth)acrylate monomers represent at least about 90% by weight of the curable resin composition, preferably about 95%, about 96%, about 97%, about 98% or about 99% of the total weight of the curable resin composition. In embodiments, the composition comprises about 98% by weight of the curable resin composition of (meth)acrylate monomers, and about 2% by weight of the curable resin composition of photoinitiator. In embodiments, the composition comprises at least about 96% by weight of the curable resin composition of (meth)acrylate monomers, and at most about 3% by weight of the curable resin composition of photoinitiator. In embodiments, the composition comprises at least about 97% by weight of the curable resin composition of (meth)acrylate monomers, and at most about 2% by weight of the curable resin composition of photoinitiator.

In embodiments, the composition comprises a first type of (meth)acrylate monomers that are at least bifunctional and lead to spatial crosslinking upon curing, and a second type of (meth)acrylate monomers that have very high aromatic content. For example, the second type of (meth)acrylate monomers may have an aromatic content of at least about 50%, at least about 60% or at least about 70%. In embodiments, substantially all of the (meth)acrylate monomers in the composition are either of the first or second type. In embodiments, the second type of (meth)acrylate monomers may form chains (i.e. no cross-linking) upon curing. In embodiments, the second type of (meth)acrylate monomers may be monofunctional. Advantageously, the second type of (meth)acrylate monomers may have a viscosity at room temperature below that of the first type of (meth)acrylate monomers. In embodiments, the second type of (meth) acrylate monomers may have a viscosity at room temperature below about 200 mPas. In embodiments, the first type of (meth)acrylate monomers may have a viscosity at room temperature above about 1,000 mPas. In embodiments, the second type of (meth)acrylate monomers may have a refractive index of at least about 1.51.

Suitable monomers for use as a second type of monomers may include ortho-phenyl-phenol-ethyl-acrylate (available as MIWON Miramer M1142, refractive index RI(ND25)=1, 577, viscosity at 25° C.=110-160 mPas) and 2-phenoxyethyl-acrylate (available as MIWON Miramer M140, refractive index RI(ND25)=1,517, viscosity at 25° C.=10-20 mPas). Further suitable monomers for use as a second type of monomers may include phenylepoxyacrylate (available as MIRAMER PE 110), benzylacrylate (available as MIRAMER M1182), benzylmethacrylate (available as MIRAMER M1183), phenoxybenzylacrylate (available as MIRAMER M1122) and 2-(phenylthio)ethylacrylate (available as MIRAMER M1162). In preferred embodiments, the composition comprises ortho-phenyl-phenol-ethyl-acrylate as the only monomer of the second type.

In embodiments, the first type of (meth)acrylate monomers may have a refractive index of at least about 1.51. Suitable monomers for use as a first type of monomer include ethoxylated(3)bisphenol-A-dimethacrylate (available as Sartomer SR348C, refractive index RI(ND25)=1, 53), and aromatic urethane diacrylate oligomers such as Allnex Ebecryl 210 (E210; refractive index approx. RI(ND25)=1,52). Further suitable monomers for use as a first type of monomer include ethoxylated (2)bisphenol-A-dimethacrylate (available as Sartomer SR348L, viscosity at 60°=1,600 mPas, refractive index similar to that of ethoxylated(3)bisphenol-A-dimethacrylate); ethoxylated (3)bisphenol-A-diacrylate (available as Sartomer SR349 or Miwon MIRAMER 244); ethoxylated (4)bisphenol-A-diacrylate (available as Miwon MIRAMER M240); bisphenol-A-diepoxyacrylate (available as Miwon MIRAMER PE210, viscosity at 60°=5000 mPas); and bisphenol-A-diepoxymethacrylate (available as Miwon MIRAMER PE250, viscosity at 60°=5,000 mPas). In preferred embodiments, the first type of (meth)acrylate monomers may be selected to have a viscosity at 60° below about 3,000 mPas, preferably below about 2,000 mPas. In preferred embodiments, the curable resin composition comprises ethoxylated(3)bisphenol-A-dimethacrylate as the only monomer of the first type.

In embodiments, the curable resin composition comprises one or more (meth)acrylate monomers of the first type and one or more (meth)acrylate monomers of the second type. In embodiments, the UV curable resin composition comprises proportions of (meth)acrylate monomers of the first and second type between about 1:1 and 1:3 by weight (i.e. one part monomers of the first type to between 1 and 3 parts monomers of the second type); such as about 1:2. In other words, the UV curable resin composition may comprise at least as much of the monomers of the second type (by weight) as of the monomers of the first type, and in some embodiments a higher amount by weight of the monomers of the second type compared to the amount by weight of monomers of the first type. In embodiments, the curable resin composition comprises at least about 15%, such as at least about 20%, at least about 25% or at least about 30% by weight (meth)acrylate monomers of the first type, and (meth)acrylate monomers of the second type up to a total percentage by weight of (meth)acrylate monomers of at least about 90%, at least 95%, at least 96%, at least 97%, or about 98% by weight. In embodiments, the curable resin composition comprises between 10 and 35% by weight of (meth) acrylate monomers of the first type, preferably between about 15% and about 30% by weight of the curable resin composition, such as about 25%. In embodiments, the curable resin composition comprises between about 35% and about 85% by weight of (meth)acrylate monomers of the second type, such as at least about 40% by weight of the curable resin composition.

In embodiments, the UV curable resin composition has a curing (polymerisation) time of 1 second or less when exposed to UV light in the appropriate wavelength range (e.g. 350-400 nm, such as 365/395 nm) with a power of at least 1 $W/cm^2$.

In embodiments, the UV curable resin composition comprises ethoxylated (3)bisphenol-A-dimethacrylate (first type of monomer) and ortho-phenyl-phenol-ethyl-acrylate (second type of monomer) as major components. In some such embodiments, the UV curable resin composition comprises a combined amount of ethoxylated (3)bisphenol-A-dimethacrylate and ortho-phenyl-phenol-ethyl-acrylate of at least about 90%, at least 92%, at least 93%, at least 94%, 95%, 96%, 97%, 98% or 99% by weight of the curable resin composition. In some such embodiments, the proportion of ethoxylated (3)bisphenol-A-dimethacrylate to ortho-phenyl-phenol-ethyl-acrylate is between about 1:1 and 1:3; such as about 1:2 (i.e. the amount by weight of ortho-phenyl-phenol-ethyl-acrylate is approx. twice the amount by weight of ethoxylated (3)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (2)bisphenol-A-dimethacrylate (first type of monomer) and ortho-phenyl-phenol-ethyl-acrylate (second type of monomer) as major components. In some such embodiments, the UV curable resin composition comprises a combined amount of ethoxylated (2)bisphenol-A-dimethacrylate and ortho-phenyl-phenol-ethyl-acrylate of at least about 90%, at least 92%, at least 93%, at least 94%, 95%, 96%, 97%, 98% or 99% by weight of the curable resin composition. In some such embodiments, the proportion of ethoxylated (2)bisphenol-A-dimethacrylate to ortho-phenyl-phenol-ethyl-acrylate is between about 1:1 and 1:3; such as about 1:2 (i.e. the amount by weight of ortho-phenyl-phenol-ethyl-acrylate is approx. twice the amount by weight of ethoxylated (2)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (3)bisphenol-A-dimethacrylate (first type of monomer) and 2-phenoxyethyl-acrylate (second type of monomer) as major components. In some such embodiments, the UV curable resin composition comprises a combined amount of ethoxylated (3)bisphenol-A-dimethacrylate and 2-phenoxyethyl-acrylate of at least 90%, at least 92%, at least 93%, at least 94%, 95%, 96%, 97%, 98% or 99% by weight of the curable resin composition. In some such embodiments, the proportion of ethoxylated (3)bisphenol-A-dimethacrylate to 2-phenoxyethyl-acrylate is between about 1:1 and 1:3, preferably about 1:2 (I.e. the amount by weight of 2-phenoxyethyl-acrylate is approx. twice the amount by weight of ethoxylated (3)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (2)bisphenol-A-dimethacrylate (first type of monomer) and 2-phenoxyethyl-acrylate (second type of monomer) as major components. In some such embodiments, the UV curable resin composition comprises a combined amount of ethoxylated (2)bisphenol-A-dimethacrylate and 2-phenoxyethyl-acrylate of at least about 90%, at least 92%, at least 93%, at least 94%, 95%, 96%, 97%, 98% or 99% by weight of the curable resin composition. In some such embodiments, the proportion of ethoxylated (2)bisphenol-A-dimethacrylate to 2-phenoxyethyl-acrylate is between 1:1 and 1:3; such as about 1:2 (i.e. the amount by weight of 2-phenoxyethyl-acrylate is approx. twice the amount by weight of ethoxylated (2)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (3)bisphenol-A-diacrylate (first type of monomer) and ortho-phenyl-phenol-ethyl-acrylate (second type of monomer) as major components. In some such embodiments, the UV curable resin composition comprises a combined amount of ethoxylated (3)bisphenol-A-diacrylate and ortho-phenyl-phenol-ethyl-acrylate of at least about 90%, at least 92%, at least 93%, at least 94%, 95%, 96%, 97%, 98% or 99% by weight of the curable resin composition. In some such embodiments, the proportion of ethoxylated (3)bisphenol-A-diacrylate to ortho-phenyl-phenol-ethyl-acrylate is between about 1:1 and 1:3, such as about 1:2 (I.e. the amount by weight of ortho-phenyl-phenol-ethyl-acrylate is approx. twice the amount by weight of ethoxylated (3)bisphenol-A-diacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-Octafluoropentyl-acrylate or a polyether-modified poly-dimethylsiloxane, as discussed below.

In embodiments, the UV curable resin composition comprises ethoxylated (3)bisphenol-A-diacrylate (first type of monomer) and 2-phenoxyethyl-acrylate (second type of monomer) as major components. In some such embodiments, the UV curable resin composition comprises a combined amount of ethoxylated (3)bisphenol-A-diacrylate and 2-phenoxyethyl-acrylate of at least about 90%, at least 92%, at least 93%, at least 94%, 95%, 96%, 97%, 98% or 99% by weight of the curable resin composition. In some such embodiments, the proportion of ethoxylated (3)bisphenol-A-diacrylate to 2-phenoxyethyl-acrylate is between about 1:1 and 1:3; such as about 1:2 (i.e. the amount by weight of 2-phenoxyethyl-acrylate is approx. twice the amount by weight of ethoxylated (3)bisphenol-A-diacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the resin composition has a surface energy below about 30 mM/m. In embodiments, the resin composition further comprises a surfactant, preferably an acrylate functionalised surfactant. In embodiments, the surfactant is beneficially chosen such that when the resin composition is applied on a polymeric surface such as PE or PET, the surfactant segregates more at the exposed resin surface than at the polymer-resin interface. In embodiments, the surfactant does not reduce the transparency of the cured resin composition. In embodiments, the surfactant may be used in a concentration below about 2% by weight of the curable resin composition, such as between about 0.1% and 2% by weight of the curable resin composition, or between about 0.5% and about 1% by weight of the curable resin composition, such as at most about 1% by weight of the curable resin composition. Suitable surfactants for use according to the invention include 1H,1H,2H,2H-perfluorooctyl acrylate (CAS 17527-29-6, available as Fluowet® AC600); 1H,1H,5H-octafluoropentyl-acrylate (available as Viscoat 8F from OSAKA ORGANIC CHEMICAL INDUSTRY LTD); (PFPE)-urethane acrylate (typically available in solution, such as in a solvent comprising a mixture of ethyl acetate and butyl acetate (for example 1:1 by weight), such as Fluorolink AD1700); polyether-modified poly-dimethylsiloxane (available, for example, as BYK-UV 3510); and 4-(1,1,3,3-Tetramethylbutyl)-phenyl-poly-ethylene glycol (available, for example, as Triton® X-100). Advantageously, surfactants for use according to the invention are not solvent-based. Particularly beneficial surfactants for use according to the invention include 1H,1H,2H,2H-perfluorooctyl acrylate (CAS 17527-29-6, available as Fluowet® AC600) and 1H,1H,5H-octafluoropentyl-acrylate (available as Viscoat 8F from OSAKA ORGANIC CHEMICAL INDUSTRY LTD). These surfactants are advantageously colourless (clear) in the above-mentioned concentrations, and enable the production of a cured polymer on a support surface (such as e.g. a PET or PE surface) that shows satisfactory adhesion to the surface.

In embodiments, the composition does not comprise an anti-adhesion additive, such as a surfactant.

According to a third aspect of the invention, there is provided a method of making a decorative structure. The method comprises providing a support having a first planar major surface and a second planar major surface opposite the first planar major surface; and forming a microstructure on the first planar major surface of the support, wherein the microstructure comprises a plurality of grooves creating a pattern of facets. The pattern of facets may comprise at least two different types of facets, wherein each different type of facet differs from each other type of facet by its geometry and/or the angle of the facet plane relative to the planar major surface of the support.

In embodiments, the method further comprises applying an at least partially reflective layer on at least one surface. Optionally, the at least one surface is selected from: the microstructure after it is formed, the first planar major surface of the support prior to forming the microstructure, and/or the second planar major surface of the support. In embodiments, the at least partially reflective layer is a reflective or a semi-transparent layer. In embodiments, the reflective or semi-transparent layer comprises a layer of silver and/or aluminium, or a plurality of layers of material forming a dielectric mirror. In embodiments, the at least partially reflective layer is a reflective (also referred to as "mirror") layer.

In embodiments, the at least partially reflective layer is a silver or aluminium layer with a thickness between about 20 nm and about 1 μm.

In embodiments, the one or more layers forming the at least partially reflective layer may be applied by physical vapour deposition (PVD) or chemical vapour deposition (PVD).

In embodiments, the method further comprises applying a decorative coating on the microstructure, as explained above in relation to the first aspect.

In some embodiments, the grooves are generally triangular, V or U shaped grooves.

In embodiments, the method further comprises forming a second microstructure superimposed over the first microstructure; optionally wherein the second microstructure, or second facet layer, is formed on the second planar major surface of the support, such that the two microstructures are superimposed and separated from each other by the support and/or an at least partially reflective layer.

In particularly preferred embodiments, the method comprises both forming the second microstructure superimposed over the first microstructure, and applying an at least partially reflective layer on at least one surface. The at least one surface may optionally be selected from: the first microstructure after it is formed, the second microstructure after it is formed, the first planar major surface of the support prior to forming the first microstructure, and/or the second planar major surface of the support. The combination of the superimposed geometries of the first and second microstructures with a reflective or partially reflective layer may advantageously result in a decorative structure having optical properties particularly closely comparable to those provided by a decorative crystal component. A user viewing such a decorative structure as it is being moved may beneficially experience unexpected light reflections and optical effects particularly similar to those created by a traditional gemstone. The at least partially reflective layer may be an at least partially reflective layer according to any one or more of the embodiments described above.

In embodiments, forming a microstructure comprises applying a layer of imprintable material and imprinting a microstructure into the layer of imprintable material using a stamp. In embodiments, the method further comprises curing the imprintable material.

In embodiments, the stamp is provided on a roller. In embodiments, applying a layer of imprintable material onto the first planar major surface of the support is performed using a roller. In embodiments, the support is provided on a roller and the step of imprinting the microstructure is performed using a roll-to-roll process. In embodiments, the support is provided as a plate and the step of imprinting the microstructure is performed using a roll-to-plate process.

In embodiments, a microstructure may be formed by applying a layer of imprintable material on the first planar major surface of the support, and imprinting a microstructure into the layer of imprintable material using a stamp. In embodiments, a further microstructure may be formed by applying a layer of imprintable material on the second planar major surface of the support, and imprinting a microstructure into the layer of imprintable material using a stamp. In embodiments, a further microstructure may be formed by applying a layer of imprintable material on a microstructure on the first major planar surface of the support, and imprinting a microstructure into the layer of imprintable material using a stamp, wherein the step of applying a layer of imprintable material on the microstructure is performed after curing of the microstructure and after an at least partially reflective layer is applied on the microstructure.

In embodiments, the imprintable material is cured during or after imprinting. As the skilled person would understand, the conditions required for curing an imprintable material may vary depending on the imprintable material. In embodiments, the imprintable material is a UV curable resin, such as a UV curable resin as described in relation to the first or the second aspect.

In embodiments, forming a microstructure comprises providing a mould having concavo-convex structures that are configured to form the grooves of the microstructure, combining the support with the mould and injecting a polymeric material in the space between the mould and the support.

In embodiments, the mould has a surface roughness Ra below about 100 nm, preferably below about 50 nm, below about 20 nm, below about 10 nm, or below about 5 nm. In embodiments, the mould has a flatness deviation $d_f$ below 2 μm, preferably below 1 μm, below 800 nm, below 500 nm or below 200 nm.

In embodiments, forming a microstructure comprises providing a microstructured reflective metallic sheet having concavo-convex structures configured to form the grooves of the microstructure, and assembling the microstructured reflective metallic sheet with the support using a polymeric material that substantially fills the grooves between the concavo-convex structures of the metallic sheet. In embodiments, providing a microstructured reflective metallic sheet comprises deep drawing a metallic sheet to create concavo-convex structures.

In embodiments, the microstructured reflective metallic sheet has a surface roughness Ra below about 100 nm, preferably below about 50 nm, below about 20 nm, below about 10 nm, or below about 5 nm. In embodiments, the microstructured reflective metallic sheet has a flatness deviation $d_f$ below 2 μm, preferably below 1 μm, below 800 nm, below 500 nm or below 200 nm.

In embodiments, the triangular structures have a height of between 30 μm and 200 μm. In embodiments, the method further comprises providing a working stamp by replicating a metallic master stamp into a polymeric stamp material, or by galvanic replication of a metallic master stamp; preferably wherein the working stamp has low surface roughness and high flatness.

Any polymeric stamp material suitable for use in nanoimprinting technologies may be used in the present invention. In particular, in embodiments the stamp is made of PDMS (polydimethylsiloxane). In embodiments, the stamp is made of a polyurethane-acrylate resin. For example, a master stamp may be used to imprint a pattern in a curable resin, which is then cured to generate a working stamp. In such embodiments, the curable resin may be provided on a substrate, preferably a polymeric substrate, such as e.g. PET. Alternatively, a master stamp may be replicated into nickel or nickel phosphorus by galvanic replication. The metallic master stamp may be a nickel or nickel phosphorus stamp.

In embodiments, the stamp comprises convex structures that are configured to form the grooves of the microstructure. In embodiments, the convex structures have a height of between 30 μm and 200 μm.

In embodiments, the working stamp has a surface roughness Ra below about 100 nm, preferably below about 50 nm, below about 20 nm, below about 10 nm, or below about 5 nm. In embodiments, the working stamp has a flatness deviation $d_f$ below 2 μm, preferably below 1 μm, below 800 nm, below 500 nm or below 200 nm. In embodiments, the master stamp has a surface roughness Ra below about 100 nm, preferably below about 50 nm, below about 20 nm, below about 10 nm, or below about 5 nm. In embodiments, the master stamp has a flatness deviation $d_f$ below 2 μm, preferably below 1 μm, below 800 nm, below 500 nm or below 200 nm.

In embodiments, the method further comprises providing a metallic master stamp, wherein providing a metallic master stamp comprises creating a plurality of substantially triangular grooves in a metal substrate using a monocrystalline diamond cutting tool; optionally wherein the monocrystalline diamond cutting tool has a non-symmetrical triangular shape (cutting profile). Advantageously, the use of a monocrystalline diamond cutting tool may enable to create a metal master stamp that has very low surface roughness and high flatness, thereby ultimately resulting in a microstructure that has low surface roughness and high flatness, and as such better optical properties. Advantageously, the use of a monocrystalline diamond cutting tool that has a non-symmetrical triangular shape may enable to create grooves that have walls at two different angles relative to the major surface of the substrate without having to rotate the diamond cutting tool relative to the metal substrate. The ability to create grooves with walls at different angles may enable the creation of microstructures that have at least two different types of facets that differ by their angle relative to the plane of the support. Further, the ability to obtain this geometry without requiring rotation of the cutting tool relative to the master stamp reduces the complexity of the cutting machine that is used to produce the stamp.

In embodiments where first and second microstructures are formed, the first and second microstructures may be formed using the same or different stamps/moulds/microstructured reflective metallic sheets. In embodiments, providing a metallic master stamp comprises creating a plurality of grooves in a metal substrate using a fly cutter.

In embodiments, creating a plurality of grooves in a metal substrate comprises creating a first set of parallel grooves and a second set of parallel grooves that at least partially intersects with the first set of parallel grooves; optionally wherein creating a plurality of grooves in a metal substrate comprises further creating a third set of parallel grooves that at least partially intersect with the first and second sets of parallel grooves.

In embodiments, the first, second and third sets of parallel grooves may have any of the features of the first, second and third sets of parallel grooves described in the first aspect. In embodiments, each of the plurality of grooves is created as continuous straight lines that preferably extend over the surface of the metallic master stamp. Advantageously, such embodiments do not require complex machinery. In embodiments, at least some of the grooves are created as discontinuous straight lines that do not extend over the surface of the metallic master stamp. For example, such master stamps may be created using a cutting machine that is able to move a diamond cutting tool into and out of contact with the metallic substrate, or using a vertical fly cutter.

In embodiments, at least some of the triangular grooves are created as curved line segments. In embodiments, at least some of the grooves have a depth that is not constant over the length of the grooves. For example, such master stamps may be created using a vertical fly-cutter.

In embodiments, the method further comprises providing for or creating flat surfaces between grooves of the metal substrate. For example, flat surfaces may be created by polishing, grinding or cutting (e.g. with a monocrystalline diamond tool) the surface of the metal substrate between adjacent grooves.

Flat surfaces between adjacent grooves may enable the formation of facets in the microstructure that are parallel to the planar surface of the support on which the microstructure is applied, as explained above in relation to the first aspect.

Embodiments of the present aspect of the invention may comprise any of the features of the first aspect. In particular, any of the features of the support, microstructure, at least partially reflective layer and decorative structure described in relation to the first aspect apply equally to the support, microstructure, at least partially reflective layer and decorative structure of the present aspect.

According to a fourth aspect, the invention provides a decorative structure produced by any embodiment of the third aspect of the invention; optionally wherein the decorative structure has any of the features of any embodiment of the first aspect of the invention.

Embodiments of the fourth aspect of the invention may comprise any of the features of the first or third aspects.

According to a fifth aspect, the invention provides a product comprising a decorative structure according to the first aspect of the invention, or as obtained by the method of the third aspect of the invention. In embodiments, the product is a garment (such as e.g. apparel, footwear, jewellery, etc.). In embodiments, the product is a packaging item, such as a box, container or bottle. In embodiments, the product is a sticker or sequin.

For the avoidance of any doubt, embodiments of any of the aspects of the invention may comprise any of the features described in relation to that aspect or any other aspect of the invention, unless such features are clearly not compatible.

BRIEF DESCRIPTION OF THE DRAWINGS

One or more embodiments of the invention will now be described, by way of example only, with reference to the appended drawings, in which:

FIG. 8A shows a fire map of the crystal, i.e. reflections from the crystal under spot illumination perpendicular to the table of the crystal, as observed on a screen at a 50 cm distance to the stone parallel to the table of the crystal; FIG. 8B is a graph of brightness across a cross section of the fire map as indicated on FIG. 8A; and FIG. 8C shows an image of the cut crystal revealing the strong contrast between light and dark areas;

FIG. 9A shows the angles at which reflection of light is expected using embodiments as shown in FIG. 2A, and FIG. 9B shows the angles at which reflection of light is expected using embodiments as shown on FIG. 2B; shaded areas indicate angles from the normal (vertical line, which is the direction of incidence of the light) where light is expected to be reflected by an at least partially reflective layer of the decorative structure, the horizontal line corresponds to the plane of the at least partially reflective layer, and the shaded areas below the horizontal lines correspond to reflections through the edges of the decorative structure;

DETAILED DESCRIPTION

The present inventors have surprisingly discovered that a decorative structure having a macroscopically flat profile and having many of the optical characteristics of gemstones could be obtained by combining a planar support with a faceted microstructure and optionally an at least partially reflective layer. The decorative structure can be advantageously highly sheet-like or plate-like, having a relatively small thickness, while creating the illusion of depth through the faceted microstructure.

Figure 2A:
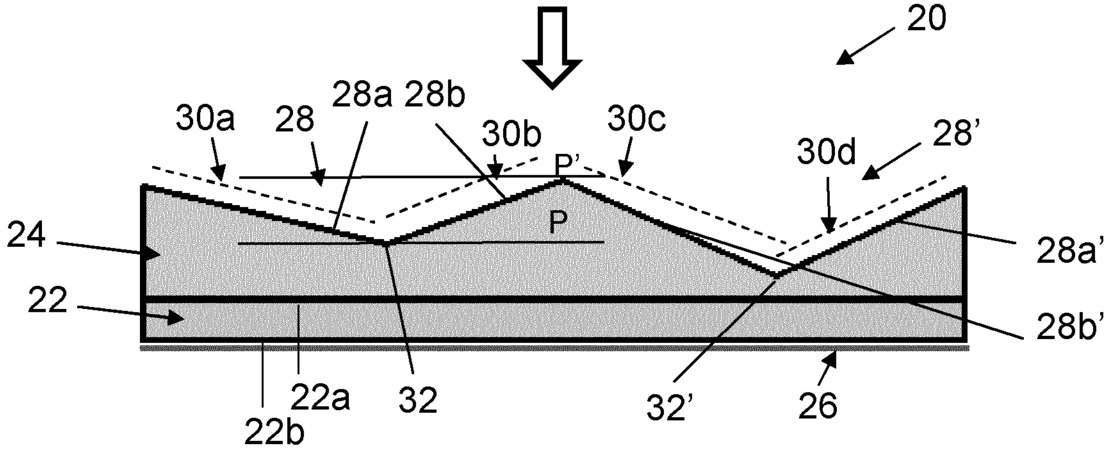
FIGS. 2A and 2B show schematic side views of decorative structures according to embodiments of the invention, comprising a support, a microstructure and an at least partially reflective layer; in the embodiment of FIG. 2A, the at least partially reflective layer is provided on the support, whereas in the embodiment of FIG. 2B, the at least partially reflective layer is provided on the microstructure.
Figure 2B:
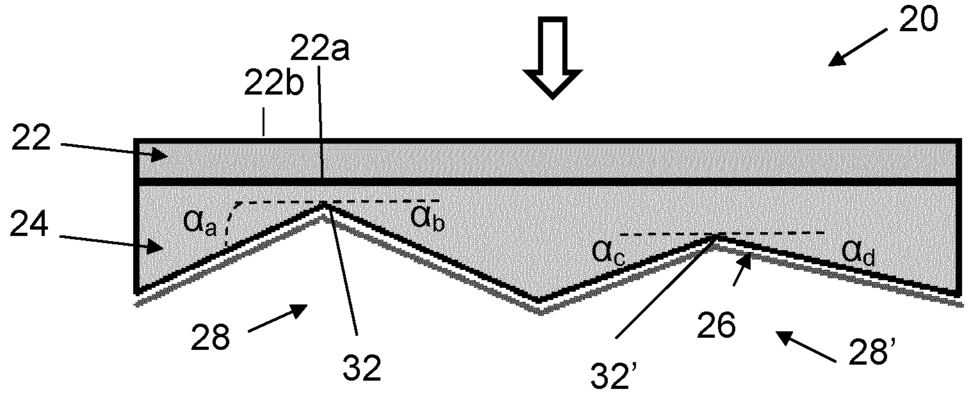

FIGS. 2A and 2B show schematic side views of decorative structures 20 according to the invention. The decorative structures 20 comprise a support 22, a microstructure 24 and, in the embodiment shown, an at least partially reflective layer 26. The support has a first planar major surface 22*a* and a second planar major surface 22*b*. The microstructure 24 is provided on the first planar major surface 22*a* of the support. In the embodiment shown on FIG. 2A, the first planar major surface 22*a* of the support 22 faces the intended viewing direction of the decorative structure, represented by the wide arrow. In the embodiment shown on FIG. 2B, the second planar major surface 22*b* of the support 22 faces the intended viewing direction of the decorative structure, represented by the wide arrow.

The microstructure 24 comprises a plurality of grooves 28, 28', which in the embodiment shown on FIGS. 2A-2B and 3A-3C are 'triangular' profile grooves formed from two planar walls 28*a*, 28*b*, 28*a'*, 28*b'* that meet at an apex 32. However, as best seen on FIG. 4B, the grooves may comprise two planar walls 28*a*, 28*b* that meet at a flat base 28*c*. In such embodiments, the flat base 28*c* is preferably narrow. For example, the width of the planar base is less than the depth of the groove; less than 0.5× the depth of the groove; or less than 0.25 × the depth of the groove. In embodiments, the grooves may comprise a triangular lower portion $G_L$ comprising two planar walls 28*a'*, 28*b'* that in the embodiment shown meet at an apex 32' (although in other embodiments these may alternatively meet at a flat base) and upper portion $G_U$ comprising walls 28*c'*, 28*d'*, at least one of the walls 28*c'*, 28*d'* extending at an angle from the walls of the triangular portion such that one or both side walls comprises two angular planes/two facet angles. In embodiments, the concept can be extended to grooves that have three or more planar portions (e.g. a lower portion, one or more middle portion(s) and an upper portion, where each portion comprises two walls, at least one of the walls extending from the corresponding wall of the preceding portion at an angle).

The grooves 28, 28' create a continuous pattern of facets 30 (indicated by dashed lines on FIG. 2A—as the skilled person would understand, the facets are portions of the walls and their dimensions along the axis perpendicular to the image is not visible on FIGS. 2 and 3), at least some of which are formed by sections of the planar walls 28*a*, 28*b*, 28*a'*, 28*b'*. Within the context of the invention, facets are substantially planar surfaces of any geometry that are adjacent to each other and meet at sharp edges and vertices, in a similar manner as the cut sides of a gemstone.

The facets 30 comprise at least two different types of facets 30*a*, 30*b*, that differ by their geometry and/or their angle $\alpha_a$, $\alpha_b$ relative to the planar major surface 22*a* of the support. In the embodiments shown on FIGS. 2A and 2B, the facets 30 comprise four types of facets 30*a*, 30*b*, 30*c*, 30*d*. The four types of facets 30*a*, 30*b*, 30*c*, 30*d* differ from each other by their angles $\alpha_a$, $\alpha_b$, $\alpha_c$, $\alpha_d$ (indicated by the dashed lines on FIG. 2B) relative to the planar major surface 22*a* of the support 22, and by their geometries at least since facets 30*a*, 30*b* and 30*c*, 30*d* are formed by walls of grooves 28, 28' that have different depths d, d'. The depth of a groove 28, 28' corresponds to the distance between a virtual plane (P) through the apex 32, 32' of the groove and parallel to the first major surface 22*a* of the support 22, and a virtual plane P' that is also parallel to the first major surface 22*a* of the support 22 and which passes through the point on the surface of the microstructure that is furthest from the first major surface 22*a*. As will be apparent to the skilled person from the content of this disclosure as a whole, facets of different type may differ from each other as a result of three components: the depth of the groove, the angle of each of the side walls creating the facets relative to the planar major surface 22*a* of the support, and the relative arrangement of the grooves. As best seen on FIG. 6, a continuous pattern of facets may comprise a collection of facets that are adjacent to each other and meet at vertices and edges. In some embodiments, such as that shown on FIG. 6, the continuous pattern of facets may comprise only triangular facets. In other embodiments, the continuous pattern of facets may comprise triangular and non-triangular facets. When non triangular facets are used, these may be parallel to the first planar major surface.

Figure 4A:
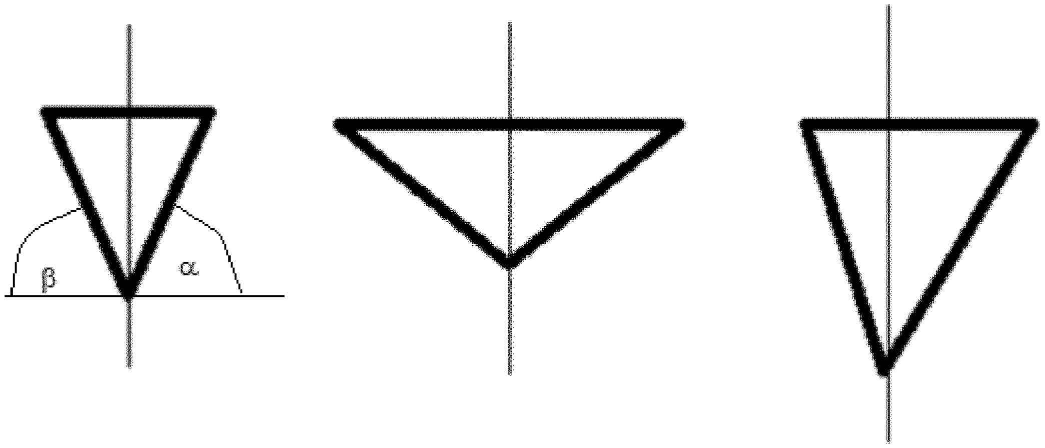
FIG. 4A shows schematically the geometry of triangular grooves that may be used according to embodiments of the invention; the left and middle panel show symmetrical grooves, whereas the right panel shows an asymmetrical groove.

In the embodiments shown on FIGS. 2A and 2B, all of the triangular grooves 28, 28' are formed from two planar walls that are arranged at a different angle to the planar surface. As best seen on FIG. 4, which shows schematically the geometry of triangular grooves that may be used according to embodiments of the invention, this is not necessarily always the case. Indeed, in other embodiments, each triangular groove may be formed from two planar walls that are at the same angle to the planar surface. In FIG. 4, the left and middle panel show symmetrical grooves, whereas the right panel shows an asymmetrical groove, as used in the embodiments of FIGS. 2A and 2B. Symmetrical grooves (FIG. 4, middle and left panels) have substantially identical angles (indicated here as $\alpha$ and $\beta$, corresponding respectively to $\alpha_a$, $\alpha_b$, and $\alpha_c$, $\alpha_d$ on FIG. 2B) between each of the walls of the groove and the plane of the major surface of the support on which the microstructure is formed. Asymmetrical grooves have different angles between each of the walls of the groove and the plane of the major surface on which the microstructure is formed. In embodiments using symmetrical grooves, the microstructure can still comprise facets formed from the walls of the triangular grooves that differ from each other by the angle of the walls creating the facets relative to the planar major surface of the support, for example, by providing two different types of grooves with different symmetrical angles between the walls and the planar surface of the support. Advantageously, the use of different angles on either side of the groove may enable to increase the visual complexity of the decorative structure, thereby increasing the "gem-like" visual appearance of the decorative structure. On the other hand, symmetrical grooves may be simpler to produce.

In embodiments (not shown), the facets 30 may also be provided, which are parallel to the first planar major surface. Such facets are not formed by sections of the side walls 28*a*, 28, 28*a'*, 28*b'* of the grooves, but may be formed from a top surface of the microstructure or a bottom surface of one or more type of groove which surfaces are parallel to the first planar major surface of the support. Advantageously, the combination of facets formed from the walls of the groove and facets parallel to the first planar major surface of the support may result in a microstructure that has a geometry similar to that of the crown of a gemstone, with a flat table surrounded by inclined facets. Where facets are present that are parallel to the first planar major surface of the support, facets formed from the walls of the grooves (i.e. facets that are inclined relative to the planar major surface of the support) advantageously cover an area of the microstructure that is approx. 3, 4, 10, 20, 50, 100, or 140 times larger than the area covered by facets that are parallel to the first planar surface of the support. In other words, the area obtained by projection of the inclined facets of the microstructure onto the first planar surface of the support is at least approx. 3, 4, 10, 20, 50, 100, or 140 times larger than the area obtained by projection of the parallel facets of the microstructure onto the first planar surface of the support. While the use of facets parallel to the first major surface of the support may contribute to generating a "gem-like" appearance (i.e. by obtaining a geometry similar to that of the crown of a classically cut gemstone), such facets may not generate optical effects that are as complex as those generated by inclined facets. As such, excessive areas covered by parallel facets may have a negative effect on the optical properties of the decorative structure, which may appear more "dull".

In embodiments, the grooves 28, 28' may have a depth of between 30 μm and 200 μm. Advantageously, this range of depth of grooves may enable to create inclined facets that have angles sufficiently high to create optical effects of interest such as fire and scintillation, while maintaining a size of facets that is sufficiently large to be distinguishable by the naked eye. Without wishing to be bound by theory, it is believed that the ability to distinguish facets with the naked eye is lost when the facets are smaller than about 300 μm at their widest point, thereby reducing the "gemstone-like" appearance of the structure. In preferred embodiments, the triangular grooves have a depth of between 50 μm and 150 μm. Such depths may be particularly amenable to production by imprint lithography. In embodiments, the triangular grooves have a depth of between 60 μm and 100 μm, such as about 90 μm.

The angles $\alpha_a$, $\alpha_b$, $\alpha_c$, $\alpha_d$ between the planar walls and the first planar surface 22*a* of the support 22 may be individually selected between about 5 and about 35°. For example, the angles between the planar walls and the planar surface of the support may be individually selected between about 5° and about 25°, preferably between about 5° and about 15°. The angles between the planar walls and the planar surface of the support may be limited to about 25°, such as at most about 20°, or at most about 17.5°. As the skilled person would understand, the fire associated with a facet may be expected to be lower with shallower angles. However, steeper angles would result in smaller facets for a given depth of the groove, where the depth of the groove is limited by the thickness of the microstructure. Angles in the above ranges may advantageously enable the structure to have acceptable fire while maintaining a size of the facets that are formed from the walls of the grooves such that these are visible with the naked eye, without exceeding depths of about 200 μm. Facets with a width of at least about 300 μm may be considered to be sufficiently large to be distinguishable with the naked eye. In the context of this disclosure, the width of a facet refers to the length of the diameter of the smallest circle that would fit the geometry of the facet. In preferred embodiments, the facets of the microstructure have a width of at least about 350 μm. Advantageously, facets that are distinguishable by the naked eye may contribute to the "gem-like" visual impression of the decorative structure.

The at least partially reflective layer 26, where present, is configured to at least partially reflect light that is incident on and/or passes through the microstructure 24 from the viewing direction, i.e. reflecting light back towards the viewing direction. In the embodiment of FIG. 2A, the at least partially reflective layer 26 is provided on the support 22, specifically on the second planar major surface of the support 22*b*, whereas in the embodiment of FIG. 2B, the at least partially reflective layer 26 is provided on the surface of the microstructure 24. The presence of a layer that reflects at least some light from the viewing direction enables the decorative structure to replicate some of the visual features associated with gemstones by interaction of the light incident on the structure from the viewing direction with the pattern of facets of the microstructure.

The at least partially reflective layer 26 may be a reflective (also referred to as "mirror" layer) or a semi-transparent layer, depending on the intended use of the decorative structure. For example, a semi-transparent (partially reflective) layer may be used when the decorative structure is intended to be used in a context where light may be predominantly or at least partially originating from behind the structure (i.e. the other side of the decorative structure from the viewing direction), such that the light should be able to pass through the decorative structure. For example, this may be the case when the decorative structure is used in architectural applications (e.g. when the decorative structure is or is applied to a room separator, e.g. a glass panel), or to form a decorative component of a lighting device where the light source is placed on the other side of the device from the viewing direction. A reflective (mirror) layer would be expected to provide a more pronounced optical effect because it would reflect more light than a semi-transparent layer. Therefore, a reflective layer may be preferably used in applications where there is no need for light to be able to pass through the structure from the side of the structure opposite the viewing direction. This may be the case in many decorative uses such as, for example, when the decorative structure is a decorative film for application on the surface of products. In some embodiments, for example, embodiments comprising multiple microstructures as will be explained further below, combinations of semi-transparent and reflective layers may be used.

A reflective or semi-transparent layer may be obtained by applying a layer of silver and/or aluminium, where the thickness of the layer may determine whether the layer is reflective or semi-transparent. For example, layers of silver or aluminium may be applied with a thickness of between about 20 nm and about 1 μm to obtain a reflective layer. Alternatively, a reflective or semi-transparent layer may be obtained by applying a plurality of layers of material forming a dielectric mirror.

The facets of the microstructure, and hence the walls of the grooves that form the facets are preferably surfaces with low surface roughness and high flatness. In the context of the present disclosure, a surface may be considered to have low surface roughness if it has a Ra<100 nm, where Ra is the arithmetic mean deviation of the surface profile, as known in the art. In the context of the present disclosure, a surface may be considered as having high flatness (also referred to as low waviness), if it has an average flatness deviation $d_f$ below 2 μm, where the flatness deviation is the maximum deviation from the intended plane of the surface, as known in the art. Preferably, the facets of the microstructure have a surface roughness Ra below about 50 nm, below about 20 nm, below about 10 nm, or below about 5 nm. In preferred embodiments, the facets of the microstructure have a flatness deviation $d_f$ below about 1 μm, below about 800 nm, below about 500 nm or below about 200 nm. Without wishing to be bound by theory, it is believed that surface roughness in excess of the above ranges may negatively impact the brilliance of the resulting microstructure and/or the fire of the resulting microstructure, due to the appearance of stray light rather than predictable consistent patterns of reflection, refraction and dispersion. Similarly, it is believed that high levels of flatness deviation may negatively impact the brilliance and/or fire of the resulting microstructure.

Figure 3A:
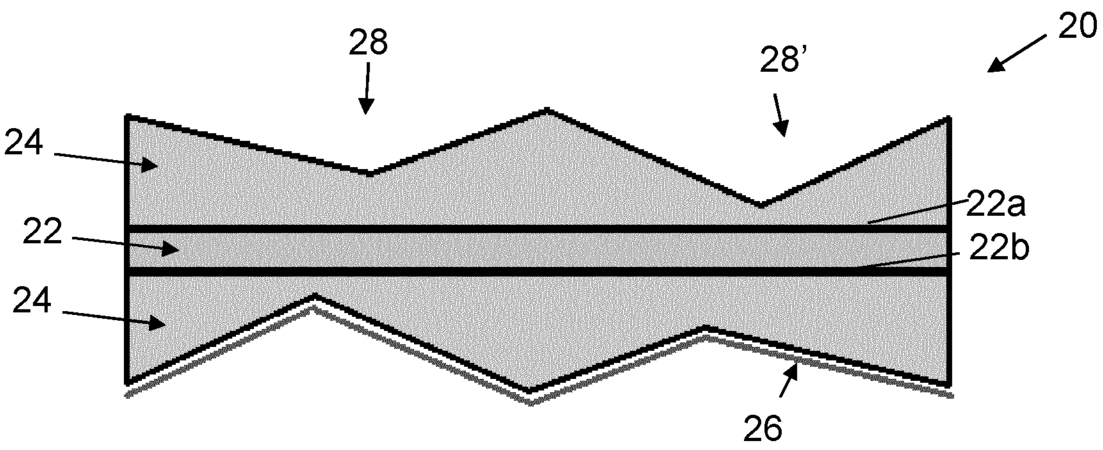
FIGS. 3A, 3B and 3C show schematic side views of decorative structures according to other embodiments the invention, comprising two superimposed microstructures; in the embodiment shown in FIGS. 3A and 3B, the two microstructures are provided on opposite major surfaces of a sheet or plate support, whereas in the embodiment shown on FIG. 3C, the two microstructures are both provided on the same side of the support.
Figure 3B:
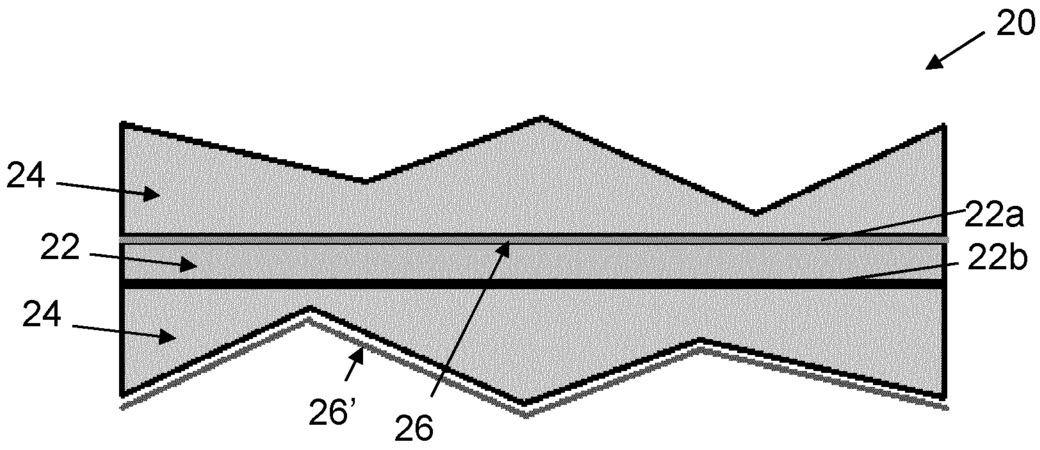
Figure 3C:
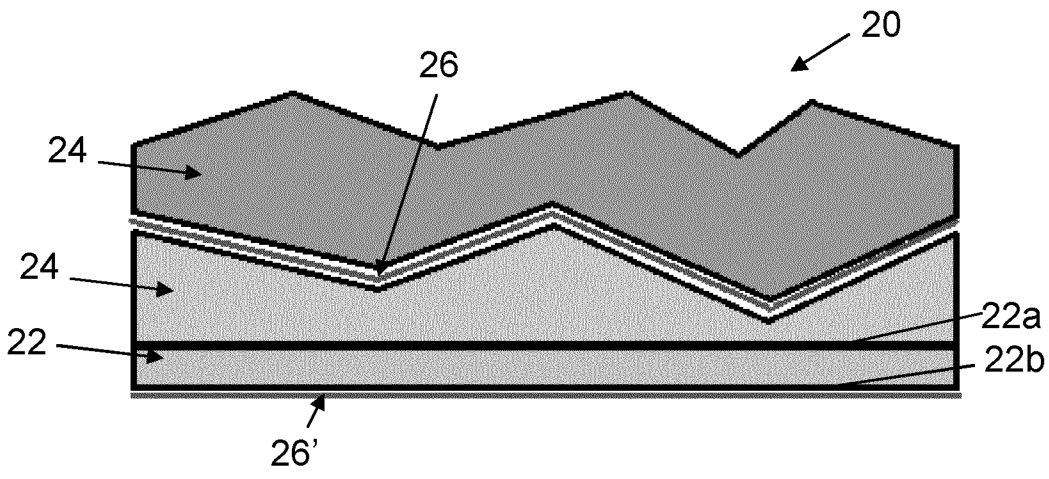
Figure 4B:
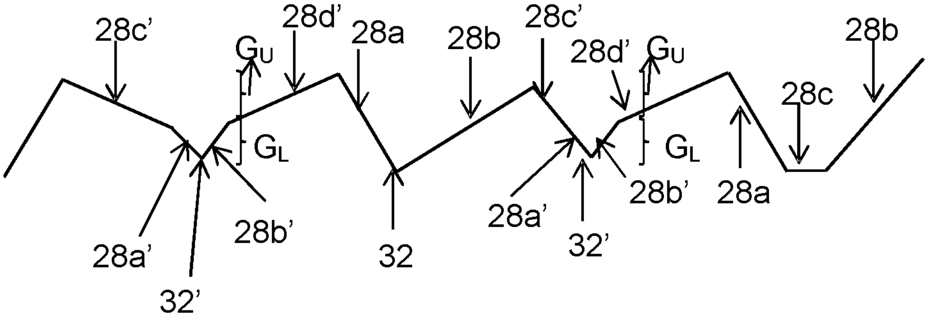
FIG. 4B shows schematically alternative geometries of grooves that may be used according to embodiments of the invention.

FIGS. 3A, 3B and 3C show schematic side views of decorative structures according to the invention, comprising two superimposed microstructures 24, 24'. In the context of this invention, the term "superimposed" refers to the two microstructures having main planes that are parallel to each other. Advantageously, the use of two or more superimposed geometries may enable to create more complex optical effects such as the appearance of unexpected light reflections when the object is moved, similar to the "sparkle" of a gemstone. Further, the use of superimposed geometries may disguise/"dilute" the appearance of the grooves forming the microstructures, thereby generating a more uniform "random-looking" appearance of facets.

In the embodiment shown in FIGS. 3A and 3B, the two microstructures 24, 24' are provided on opposite planar major surfaces 22*a*, 22*b* of the support 22; whereas in the embodiment shown on FIG. 3C, the two microstructures 24, 24' are both provided on the same side of the support 22. As such, in the embodiment shown in FIGS. 3A and 3B, the two microstructures are separated from each other by the support. In the embodiment shown on FIG. 3B, the two microstructures are separated from each other by the support 22 and by a partially reflective (i.e. semi-transparent) layer 26 applied on one of the major surfaces 22*a*, 22*b* of the support 22—in this case the first major surface 22*a*. In this embodiment, an additional reflective layer 26' is provided on one of the microstructures, in this case microstructure 24'.

In the embodiment shown in FIG. 3C, the two microstructures are separated from each other by a partially reflective (i.e. semi-transparent) layer 26. The partially reflective layer 26 may ensure that optical effects are created by the combination of both microstructures, since effects (e.g. refraction and dispersion) created by the microstructure furthest from the viewing direction may otherwise be lost or significantly reduced, particularly if the two structures are made from the same material. In this embodiment, an additional reflective layer 26' is provided on one of the major surfaces of the support, in this case the second major surface 22*b*.

While the embodiments shown in FIGS. 3A, 3B and 3C comprise two superimposed microstructures, as the skilled person would understand, the concept can be extended to include further superimposed microstructures, thereby increasing the complexity of the optical impression generated by the decorative structure. As the skilled person would understand, in embodiments comprising two superimposed microstructures, any at least partially reflective layer between the two superimposed microstructures is preferably semi-transparent, in order to enable optical effects caused by each of the microstructures to be visible from the viewing direction.

The two superimposed microstructures preferably have different arrangements of facets, in order to increase the complexity of the optical effects created by the combination of microstructures. Different arrangements of facets can be obtained by using two microstructures that have different geometries (e.g. different configurations of triangular grooves), or similar (possibly identical) geometries that are superimposed such that the two microstructures are not aligned when viewed perpendicular to the main planes of the microstructures (i.e. from the viewing direction). For example, the two microstructures may have similar geometries that are rotated relative to each other. Advantageously, the use of different geometries or similar geometries that are not aligned increase the complexity of the geometric pattern created by the decorative structure, thereby increasing the "gem-like" appearance of the decorative structure.

In the embodiments shown in FIGS. 2A, 2B, 3A, 3B and 3C, the microstructure is formed from a material that is applied on the support. For example, these microstructures may be formed from a layer of material that is applied to or otherwise bonded to the support prior to or after formation of the microstructure. Advantageously, the use of a layer of material distinct from the support to form the microstructure may enable an increase in flexibility in the choice of material of the support, which may then be selected, for example, according to the intended use of the decorative structure. In other embodiments, the microstructure may be integrally formed with the support, and may comprise the same or a different material. In embodiments where the microstructure is formed from a material that is applied on the support, as shown in FIGS. 2A, 2B, 3A and 3B, the microstructure may be formed by imprinting, such as by imprint lithography. Alternatively, the microstructure may be formed by moulding, such as e.g. injection moulding, thermoforming, or casting, directly on the support, or integrally with the support, such that the microstructure is formed directly in the support body. In embodiments, the microstructure may be formed by providing a microstructured reflective sheet and combining this with the support by providing a material between the reflective sheet and the support, the material forming the microstructure by conforming to the microstructure in the reflective sheet. In some such embodiments, the reflective sheet may be a metal mirror sheet. In some such embodiments, the metal mirror sheet may be microstructured by any method known in the art, for example, by deep drawing.

Figure 5A:
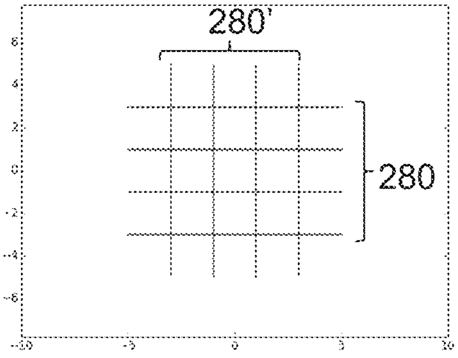
FIGS. 5A, 5B and 5C show schematically configurations of sets of parallel grooves according to embodiments of the invention. In the embodiment shown in FIG. 5A, two sets of grooves intersecting at 90° are used, producing a two-fold symmetrical pattern. In the embodiment shown on FIG. 5B, two sets of grooves intersecting at an angle different from 90° are used, producing a two-fold asymmetrical pattern. In the embodiment shown in FIG. 5C, three sets of grooves intersecting at 60° are used, producing a three-fold symmetrical pattern.
Figure 5B:
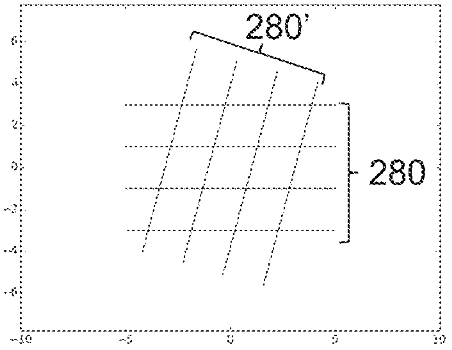
Figure 5C:
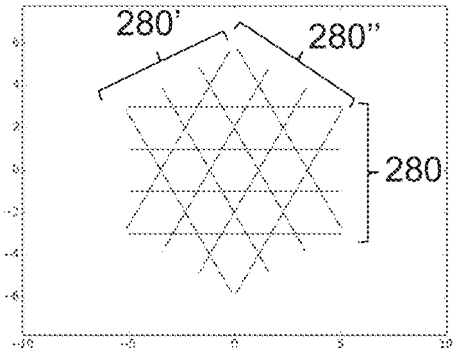

FIGS. 5A, 5B and 5C show, schematically, arrangements of triangular grooves according to embodiments of the invention—each line symbolising one triangular groove across the surface of the microstructure. In the embodiments shown, the triangular grooves comprise sets of parallel triangular grooves that intersect to generate a pattern of facets. In the embodiment shown in FIG. 5A, two sets of grooves 280, 280' intersecting at 90° are depicted, producing a two-fold symmetrical pattern of facets. In the embodiment shown in FIG. 5B, two sets of grooves 280, 280' intersecting at an angle different from 90° are depicted, producing a two-fold asymmetrical pattern of facets. Two-fold asymmetrical patterns may be advantageous because they may result in larger facets compared to a corresponding symmetrical pattern, with similarly spaced grooves, and higher visual complexity. Two fold symmetrical patterns on the other hand may be advantageous because they do not result in large angular regions without reflection of light upon a mirror layer when present in the structure. In the embodiment shown in FIG. 5C, three sets of grooves 280, 280', 280" intersecting at 60° are used, producing a three-fold symmetrical pattern of facets. Advantageously, such geometries may represent a good compromise between the properties of fire, redirection angles of incident light and facet size.

Further, in the embodiments shown in FIGS. 5A, 5B and 5C, the grooves within each set of parallel grooves are each spaced from the adjacent groove in the same set by approximately the same distance. In other words, all of the grooves within a set are substantially equidistant. Advantageously, the use of equidistant grooves within each set may ensure that the sizes of the facets are approximately constant across the microstructure. In other embodiments (not shown), the grooves within each set of parallel grooves may be spaced form each other by distances that vary within a set. For example, the distances between adjacent grooves in a set may be randomly selected, or may be made to vary according to a predetermined pattern. The use of non-equidistant grooves may increase the complexity of the visual impression generated by the structure, by increasing the "unpredictability" of the visual impression and thereby increasing the "gem-like" appearance of the structure. However, the use of non-equidistant grooves may cause the appearance of comparatively large areas without fine patterning of facets, which areas may appear dull in comparison with more densely faceted areas.

As the skilled person would understand, all of the parallel grooves in each set may be symmetrical or asymmetrical grooves, and all of the grooves within a set may be configured so as to have the same or different angles between each of the planar walls forming each groove and the planar surface of the support.

In embodiments comprising multiple superimposed microstructures, the microstructures may be chosen to have different geometries that have the same fold symmetry. For example, two microstructures may be used that both have two-fold or three-fold symmetry, but which may vary by the distance between the grooves or the combination of angles between the walls of the grooves and the surface of the support on which the microstructure is applied. Advantageously, when the two microstructures have similar geometries or the same fold symmetry, the two microstructures may be rotated relative to each other by an angle that is not a rotational angle of symmetry of the microstructures. For example, when the microstructures have two-fold symmetry, the two microstructures may be rotated relative to each other by an angle that is not 90 or 180°. Similarly, when the microstructures have three-fold symmetry, the two microstructures may be rotated relative to each other by an angle that is not 60, 120 or 180°. For example, the two microstructures may be rotated relative to each other by an angle of about 25°.

In embodiments the grooves of each set may be spaced by between approx. 300 μm and 5,000 μm. In embodiments, the grooves may be spaced by between approx. 300 μm and approx. 2,500 μm. In embodiments, the spacing between grooves may be adapted depending on the depth of the grooves. For example, deeper grooves (thicker microstructures) may be more distant from each other. In embodiments, the grooves have a depth of about 90 μm and the grooves of each set are spaced by between approx. 300 μm and approx. 500 μm. In embodiments, the width of each groove may be between 300 μm and 2,500 μm etc.

Figure 6:
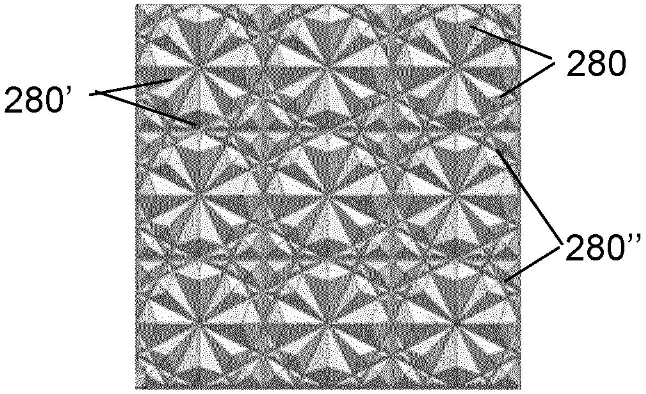
FIG. 6 shows an example of a microstructure according to the invention, comprising an arrangement of three sets of parallel symmetrical triangular grooves.

FIG. 6 shows an example of a microstructure according to the invention, comprising an arrangement of three sets of parallel grooves 280, 280' and 280', each set comprising equidistant grooves. In the embodiment shown on FIG. 6, each of the sets of parallel grooves comprises symmetrical triangular grooves, a first set of parallel grooves with side walls arranged at an angle of 13.925° relative to the first major planar surface of the support (i.e. the grooves each comprise two walls that meet at an apex or narrow base, the walls being both inclined relative to the first major surface of the support by an angle of 13.925°); a second set of parallel grooves with side walls arranged at an angle of 10.5° relative to the first major planar surface of the support (i.e. the grooves each comprise two walls that meet at an apex or narrow base, the walls being both inclined relative to the first major surface of the support by an angle of 10.5°); and a third set of parallel grooves having an angle of 2.155° relative to the first major planar surface of the support (i.e. the grooves each comprise two walls that meet at an apex or narrow base, the walls being both inclined relative to the first major surface of the support by an angle of 2.155°). In the embodiment shown in FIG. 6, the grooves are substantially straight lines that each extend continuously substantially over the whole of the microstructure. The use of straight lines extending over the whole length of the structure may be advantageous from a manufacturing point of view as it may enable relatively simple machines to be used, and relatively fast production processes (since a groove may be created in a single movement of e.g. a cutting tool). In other embodiments, the grooves may be formed from substantially straight and elongate line that extends over a part of the microstructure. In other words, the grooves may be formed from one or more line segments arranged at specific angles relative to each other (i.e. grooves may "turn"/comprise broken lines and may start and finish within the microstructure, and do not necessarily form a single straight line that extends over the whole microstructure. In embodiments, the grooves are substantially straight lines that extend over a part of the microstructure and that together form a triangulation of a set of points (i.e. when view from above). The use of complex patterns of grooves that do not extend in a straight line over the whole microstructure may advantageously result in more complex geometries than could not be obtained using patterns of intersecting straight lines. In the embodiment shown on FIG. 6, the angles between the different sets of parallel grooves (also referred to as Azimut angles) are: (i) 90° between grooves 280 and 280", (ii) 26.57°/153.43° between grooves 280 and grooves 280', and (iii) 63.43°/116.57° between grooves 280' and grooves 280".

The support 22 is preferably made from a transparent material. Within the context of the present invention, a material is called transparent if it allows the transport of light, in particular at least visible light. Typically, the material is transparent in the conventional sense, i.e. allowing (at least visible) light to pass through the material without being scattered. As the skilled person would understand, the use of a transparent support may be particularly advantageous in embodiments such as those shown in FIGS. 2A, 2B, 3B, 3A, 3B and 3C where the optical impression generated by the decorative structure relies on light passing through the support from the viewing direction to be at least partially reflected by a reflective or semi-reflective layer located on the side of the structure opposite from the viewing direction. However, in some embodiments that do not rely on multiple microstructures on the first and second major surfaces of the support to create a complex optical impression, the at least partially reflective layer may be located relative to the support such that the transparency of the material of the support does not impact the optical impression generated by the decorative structure.

As the skilled person would understand, the material of the support may be selected depending on at least the intended application of the decorative structure. As such, the support can be made from a variety of materials. For example, the support may be made from a material selected from glass, such as crystal glass (e.g. crystal glass as defined by the European Crystal Directive (69/493/EEC) may be particularly advantageous due to their superior optical properties), ultrathin glass, chemically strengthened glass (such as e.g. Gorilla® Glass from Corning®), or an organic polymer such as PET (polyethylene terephthalate), PMMA (poly(methyl methacrylate)), or PE (polyethylene). As the skilled person would understand, the support may be made from a composite material comprising one or more materials selected from the above list, such as, for example, one or more layers of glass and/or one or more layers of polymers. Thus, the support may be a safety glass panel comprising two layers of glass separated by a layer of transparent elastomeric material.

'Glass' in this context means any frozen supercooled liquid that forms an amorphous solid. Oxidic glasses, chalcogenide glasses, metallic glasses or non-metallic glasses can be employed. Oxynitride glasses may also be suitable. The glasses may be one-component (e.g. quartz glass) or two-component (e.g. alkali borate glass) or multi-component (e.g. soda lime glass) glasses. The glass can be prepared by melting, by sol-gel processes, or by shock waves. Such methods are known to the skilled person. Inorganic glasses, especially oxidic glasses, are preferred. These include silicate glasses, soda lime glasses, borate glasses or phosphate glasses. Lead-free crystal glasses are particularly preferred. In embodiments, silicate glasses are preferred. Silicate glasses have in common that their network is mainly formed by silicon dioxide ($SiO_2$). By adding further oxides, such as alumina or various alkali oxides, alumosilicate or alkali silicate glasses are formed. If phosphorus pentoxide or boron trioxide is the main network former of a glass, it is referred to as a phosphate or borate glass, respectively, whose properties can also be adjusted by adding further oxides. The mentioned glasses mainly consist of oxides, which is why they are generically referred to as oxidic glasses. In embodiments, the support may be made of lead and barium-free crystal glass. Examples of suitable lead and barium-free crystal glass compositions for use in the present invention are disclosed in EP 1725502 and EP 2625149, the contents of which are incorporated herein by reference.

In embodiments, the support is made of plastic. Transparent plastics are preferred. Among others, the following materials are suitable: acrylic glass (polymethyl methacrylates, PMMA); polycarbonate (PC); polyvinyl chloride (PVC); polystyrene (PS); polyphenylene ether (PPO); polyethylene (PE); polyethylene therephtalate (PET), and poly-N-methylmethacrylimide (PMMI).

An advantage of using a plastics material over glass in the manufacture of supports for use in the present invention resides, in particular, in the lower specific weight, which is only about half that of glass. In addition, other material properties may also be selectively adjusted. Further, plastics are often more readily processed as compared to glass. Some disadvantages of the use of plastics materials include the low modulus of elasticity and the low surface hardness as well as the massive drop in strength at temperatures from about 70° C. and above, as compared to glass.

In embodiments, the support is a substantially flat structure, such as e.g. a panel, sheet or film of material. For example, the support may be a flexible film of material. The support may be a film made from an organic polymer such as PET, PMMA or PE. In some such embodiments, the film has a thickness of at most 2 mm, at most about 1 mm, at most about 500 μm, between about 100 μm and about 200 μm, or suitably about 125 μm. In some embodiments, the decorative structure may have a weight below 1 kg/$m^2$, preferably below 500 g/$m^2$, such as about 250 g/$m^2$. Lightweight films may advantageously be applied on large surfaces and/or light articles without negatively impacting the properties of the articles to which the film is applied.

The microstructure is also preferably made from a transparent material. Advantageously, the use of a transparent material enables visible light to travel through the material of the microstructure such that it can be at least partially reflected by the at least partially reflective layer, where the combination of faceting and reflection results in patterns of refraction that are similar to those created by a gemstone. Preferably, the microstructure is made from a material that is non-diffusive. Within the context of the invention, a material may be considered as non-diffusive if it exhibits mostly specular reflection. Beneficially, a non-diffusive material does not exhibit any diffusive reflection, or only exhibits very low levels of diffusive reflection, such that the material does not appear as milky or turbid. The microstructure may advantageously be made from a material that has high optical dispersion.

In the context of the present invention, a material may be considered to have high optical dispersion if it shows a high variation of refractive index as a function of wavelength in the visible range. For example, a material may be considered to have a high optical dispersion if it has a low Abbe number, such as an Abbe number below about 60, preferably below about 50, below about 40 or below about 35. Advantageously, the use of a material with high optical dispersion may increase the colour split that occurs when white light interacts with the facets of the structure. This may in turn improve the fire of the structure for a given maximum angle of facets. Without wishing to be bound by theory, it is believed that the fire of the structure is influenced by the optical dispersion of the material of the microstructure as well as the angles of the facets (formed by the walls of the grooves) relative to the plane of the structure. Sharper facets are expected to improve fire, as would higher dispersion. Therefore, a given requirement, e.g. in relation to the fire exhibited by the structure, may be achievable by balancing at least these two parameters. For example, in embodiments where shallow facets are preferred, materials with higher dispersion may be chosen compared to embodiments using facets at steeper/sharper angles of inclination to the planar surface of the support. The Abbe number of a material may be determined, for example, by ellipsometry, as known in the art. In particular, the refractive index of the material at multiple wavelengths at least within the visible range may be measured, for example, using variable angle spectroscopic ellipsometry, and the Abbe number may be calculated as $v=(nd-1)/(nF-nC)$ where nd, nF and nC are the refractive indices of the material at the wavelengths of the Fraunhofer d- (He light source), F- (H light source) and C- (H light source) spectral lines (587.56 nm, 486.13 nm and 656.27 nm respectively) or $v=(ne-1)/(nF'-nC')$, where ne, nF' and nC' are the refractive indices of the material at the wavelengths of the Fraunhofer e- (Hg light source), F'- (Cd light source) and C'- (Cd light source) spectral lines (546.07 nm, 479.99 nm and 643.86 nm respectively).

In embodiments, the microstructure is made from any polymer that is suitable for imprinting, as known in the art. In embodiments, the microstructure is made from hybrid polymers. In embodiments, the microstructure is made from UV-curable or thermally curable paints. In embodiments, the microstructure is made from a thermosetting material, such as e.g. sol-gel or polycarbonate. The microstructure may be made from a material obtained by curing a curable resin composition, for example, a UV curable resin composition. This may enable the microstructure to be provided by forming a resin composition in a plastic state then curing it to obtain a substantially solid structure. In embodiments, the UV curable resin composition comprises acrylate and/or methacrylate monomers, and has a high aromatic content, as will be explained further below. In the context of the invention, a composition may be considered to have a high aromatic content if the composition has an aromatic content of at least about 40%, preferably at least about 50%. The aromatic content of a compound or composition may be quantified as the proportion of the carbon atoms in the compound or composition that are part of aromatic rings. Advantageously, the use of UV curable resin compositions with a high aromatic content may be associated with high refraction indices and high dispersion, compared to commonly used imprinting resins. As explained above, this may contribute to increasing the fire of the decorative structure.

The decorative structure may further comprise a decorative coating applied on at least a region of the microstructure. Any decorative coating that is at least semi-transparent may be used in the present invention. For example, a decorative coating may be configured to give a coloured appearance to the region of the microstructure on which it is applied. Colouring and decorative coatings may enable the decorative element to be provided with a variety of decorative effects, improving their flexibility of use. In embodiments, a decorative coating may be configured to provide a complex decorative optical effect on the region of the microstructure on which it is applied. These can be achieved using a multi-layer interference system (such as e.g. alternating layers of $TiO_2$ and $SiO_2$) that creates a desired optical effect, using a multi-layer system (such as e.g. alternating thin layers of $Fe_2O_3$ and Cr) that creates a desired optical effect by causing a wavelength-specific ratio of transmission and reflection of light; or using a multi-layer system that creates a desired optical effect by causing a wavelength-specific absorption and reflection of visible light such that some wavelengths are intensely reflected while others are absorbed. The layers of the multi-layer systems described above may be deposited by any PVD or CVD method known in the art, such as e.g. by sputtering.

The support and/or the microstructure may be coloured. For example, a colouring agent may be provided throughout the body of the support and/or the microstructure. For example, when the support is made of glass or crystal glass, a colouring can be achieved by introducing metal oxides in the glass. Alternatively or in addition to colouring the material of the support or the microstructure, a colouring may be provided as a coating or other surface treatment on at least a region of the support or the microstructure.

The decorative structure may further comprise a backing layer. For example, a backing layer may be provided in combination with a reflective layer, on the side of the reflective layer that is opposite from the microstructure(s).

In embodiments, the backing layer may comprise a protective layer. A protective layer may advantageously protect the decorative structure, and in particular the reflective layer on the decorative structure, from mechanical and/or chemical damage.

In embodiments, the backing layer comprises a protective layer and one or more adhesive layer(s), at least one of the one or more adhesive layers being provided on the side of the backing layer that is exposed in the finished decorative structure.

The protective layer may comprise a layer of lacquer. In embodiments, the layer of lacquer comprises a lacquer selected from the group consisting of: epoxy lacquers, one component polyurethane lacquers, bi-component polyurethane lacquers, acrylic lacquers, UV-curable lacquers, and sol-gel coatings. The lacquer may optionally be pigmented. Lacquer may be applied by any method known in the art, such as by spraying, digital printing, rolling, curtain coating or other two-dimensional application methods known in the art. Suitably, the lacquer may be selected so as to be mechanically and chemically robust and bondable. In embodiments, a lacquer is mechanically and chemically robust if it would not substantially degrade or allow degradation of an underlying reflective layer in the conditions that would be expected in the intended use. For example, the decorative structure may advantageously show high resistance to any of sweat, machine washing, temperature changes, sun exposure test, and suitable performance in anti-corrosion salt spray and climate tests. Resistance to machine washing may be tested by subjecting a sample of the decorative structure to 10 cycles of machine washing at 40° C., optionally followed by drying, and examining the decorative structure for any visible damage, with the naked eye. Suitable performance in climate tests may be tested by exposing a sample of the decorative structure to climate tests (e.g. exposure to the environment or a simulated environment) for 480 hours, and examining the decorative structure for any visible damage, with the naked eye. Resistance to sweat may be tested by putting a sample of the decorative structure in contact with artificial sweat for 48 hours, and examining the sample for any visible damage, with the naked eye. Resistance to temperature changes may be tested by subjecting a sample of the decorative structure to 20 cycles of temperature changes, and examining the sample for any visible damage, with the naked eye. For example, a cycle of temperature changes may comprise exposing the decorative element to a temperature of about 70° C., followed by a sudden transfer to −20° C., then to room temperature (such as e.g. between 20 and 25 °C.). Resistance to sun exposure may be tested by subjecting a sample of the decorative structure to a simulated solar energy of 13.8 $MJ/m^2$ and examining the decorative element for any visible damage, with the naked eye. For example, the sample may be subjected to light between about 300 and about 800 nm at about 650 $W/m^2$ for a period of about 48 to 72 hours, such as about 62.8 hours. Suitable performance in anti-corrosion salt spray may be tested by exposing a sample of the decorative element to sea water tests for 96 hours, and examining the sample for any visible damage, with the naked eye. The lacquer may additionally ensure that the decorative structure according to the invention is bondable. As the skilled person would understand, the choice of a suitable lacquer may depend on the material to which the decorative element is intended to be bonded, and/or on the adhesive that is intended to be used. Lacquer may be applied with a thickness of between about 4 and 14 μm (i.e. 9±5 μm); for example, the lacquer may be applied with a thickness of about 9 μm.

Figure 7:
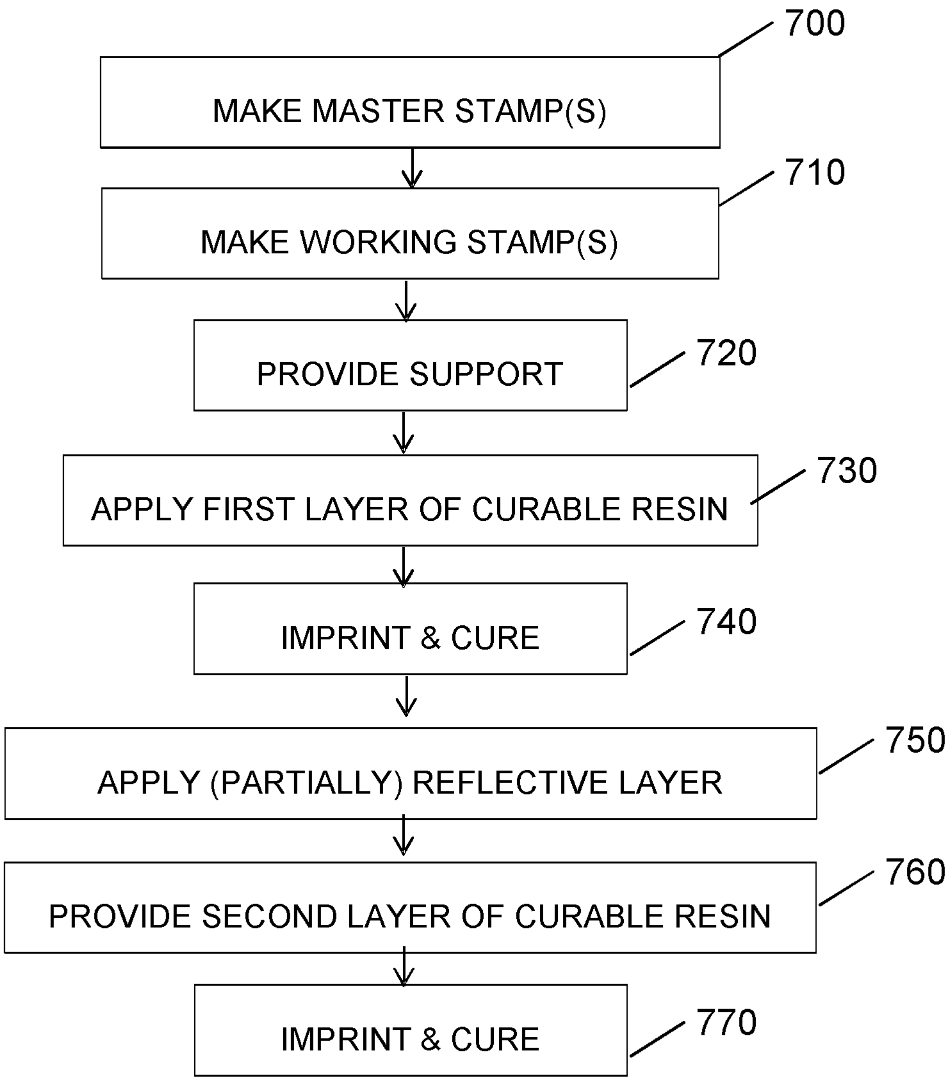
FIG. 7 is a flowchart illustrating a method of making a decorative structure according to embodiments of the invention.

FIG. 7 is a flowchart illustrating a method of making a decorative structure according to embodiments of the invention, using nanoimprint lithography.

At step 700, a master stamp for imprinting is provided. A master stamp is typically a metallic structure that can be used to replicate a pattern onto a working stamp. For example, a nickel or nickel phosphorus stamp may be used. Providing a metallic master stamp comprises creating a plurality of triangular grooves in a metal substrate using a monocrystalline diamond cutting tool. Advantageously, the use of a monocrystalline diamond cutting tool may enable to create a metal master stamp that has very low surface roughness and high flatness, thereby ultimately resulting in a microstructure that has low surface roughness and high flatness and, as such, better optical properties. Preferably, the master stamp has a surface roughness Ra below about 100 nm, preferably below about 50 nm, below about 20 nm, below about 10 nm, or below about 5 nm. Advantageously, the master stamp has a flatness deviation $d_f$ below about 2 μm, preferably below about 1 μm, below about 800 nm, below about 500 nm or below about 200 nm. The monocrystalline diamond cutting tool may be chosen to have a symmetrical triangular shape, to create grooves as shown on FIG. 4, left and middle panels, or to have a non-symmetrical triangular shape, to create grooves as shown on the right panel of FIG. 4. Advantageously, the use of a monocrystalline diamond cutting tool that has a non-symmetrical triangular shape may enable to create grooves that have walls at two different angles without having to rotate the diamond cutting tool relative to the metal substrate. The ability to create grooves with walls at different angles may enable the creation of microstructures that have at least two different types of facets that differ by their angle relative to the plane of the support. Further, the ability to obtain this geometry without requiring rotation of the cutting tool relative to the master stamp reduces the complexity of the cutting machine that is used to produce the stamp.

The plurality of triangular grooves may comprise a first set of parallel grooves and a second set of parallel grooves that at least partially intersects with the first set of parallel grooves, as explained above in relation to FIGS. 5A and 5B. The plurality of triangular grooves may further comprise a third set of parallel grooves that at least partially intersect with the first and second sets of parallel grooves, as explained above in relation to FIG. 5C. Each of the plurality of triangular grooves may be created as continuous straight lines that extend over the surface of the metallic master stamp, as explained above in relation to FIG. 6. Advantageously, such embodiments do not require complex machinery. Alternatively, at least some of the triangular grooves may be created as discontinuous straight lines that do not extend continuously over the surface of the metallic master stamp. For example, such master stamps may be created using a cutting machine that is able to move the diamond cutting tool into and out of contact with the metallic substrate, or a fly cutter. Further, at least some of the grooves may be created as curved line segments. Some grooves may have varying depths along their length. For example, such master stamps may be created using vertical fly-cutting. In embodiments, the method further comprises providing flat surfaces between triangular grooves of the metal substrate, thereby creating facets in the microstructure that are parallel to the planar surface of the support on which the microstructure is applied, as explained above in relation to FIGS. 2 and 3. For example, flat surfaces may be created by polishing, grinding or cutting (e.g. with a monocrystalline diamond tool) the surface of the metal substrate between adjacent grooves.

In embodiments where first and second microstructures are formed, the first and second microstructures may be formed using the same or different stamps, depending on the geometries of the microstructures, as explained above. As the skilled person would understand, when the microstructures are moulded or provided by filling cavities in microstructured reflective metal sheets, the first and second microstructures may similarly be formed using the same or different stamps moulds/microstructured reflective metallic sheets.

At step 710, one or more working stamp(s) are produced by replicating the metallic master stamp into a polymeric stamp material, or, for example, by replicating the metallic master stamp by galvanic replication. Any polymeric stamp material suitable for use in nanoimprinting technologies may be used in the present invention. In particular, the working stamps may be made of PDMS (polydimethylsiloxane), or using a polyurethane-acrylate resin, for example, a UV curable polyurethane-acrylate resin. Alternatively, where galvanic replication is used, the working stamps may be made of nickel or nickel phosphorus. The working stamp preferably has low surface roughness and high flatness. For example, the working stamp may have a surface roughness Ra below about 100 nm, preferably below about 50 nm, below about 20 nm, below about 10 nm, or below about 5 nm. Beneficially, the working stamp has a flatness deviation $d_f$ below about 2 μm, preferably below about 1 μm, below about 800 nm, below about 500 nm or below about 200 nm.

At step 720, a support is provided. The support has a first planar major surface and a second planar major surface opposite the first planar major surface, and may be as described above. The support may be provided on a roll or on a plate, depending for example on the configuration and materials of the support.

At step 730, a layer of imprintable material such as a curable resin is applied on the first planar major surface of the support. Applying a layer of imprintable material onto the first planar major surface of the support may be performed using a roller. The thickness of the layer of imprintable material may be between about 30 μm and about 200 μm, such as between about 50 μm and about 150 μm. The maximum thickness of the layer that can be applied may depend on the properties of the curable resin, and may in particular be limited by the penetration depth of radiations used to cure the resin.

At step 740, the layer of imprintable material is imprinted using the working stamp, for example, provided on a roller. At the same time or shortly thereafter, the imprintable material is cured. For example, when the imprintable material is a light (e.g. UV) curable resin, the resin may be cured through the stamp and/or through the support by exposing the resin to electromagnetic (e.g. UV) radiation. Preferably, the imprintable material is cured at the same time as imprinting, in order to reduce the risk of reflow of the imprintable material and/or the risk of the imprintable material adhering to the stamp. Preferably, the imprinting material is cured at least partially by exposing the imprintable material to electromagnetic radiation through the support. This may advantageously remove requirements on the stamp to be transparent to the electromagnetic radiation used. In such embodiments, the support is preferably transparent to the electromagnetic radiation in a wavelength range suitable to cure the imprintable material (e.g. allowing at least about 50%, at least about 70%, at least about 80%, at least about 90%, at least about 95% or at least about 98% of the radiation within the desired wavelength range to pass through the substrate). Such embodiments may be particularly suitable for use in embodiments where a transparent substrate (such as e.g. various polymeric films or plates, glass plates etc.) is desirable. As the skilled person would understand, the method of curing may depend on the imprintable material. In particular, different materials may require different conditions (temperature, humidity, radiations) to cure. Further, some materials may not cure but instead solidify, in which case the material may be imprinted then allowed to solidify. The curable resin may be chosen as a UV curable resin, such as a UV curable resin as described further below. In embodiments, the microstructure is formed by thermal imprinting.

At step 750, an at least partially reflective layer may optionally be applied. As explained above, the at least partially reflective layer may be provided on the microstructure and/or on the first or second planar major surface of the support. As such, step 750 may be performed prior to forming the microstructure or after a second layer of curable resin as been formed. The at least partially reflective layer may have any of the properties explained above. In particular, the one or more layers forming the at least partially reflective layer may be applied by physical vapour deposition (PVD) or chemical vapour deposition (CVD).

In embodiments, the method further comprises applying a decorative coating on the microstructure, as explained above.

According to the depicted embodiment, at step 760 which is an optional step), a second layer of imprintable material is provided, either on the second planar major surface of the support, or on the previously formed, cured and coated microstructure. In embodiments, the second layer of imprintable material is imprinted and cured 770, in a similar way as step 740. As explained above, step 770 may use the same or a different stamp from step 740. Further, it may be advantageous for the support to be rotated relative to the working stamp before imprinting at step 770, in order to produce complex optical effects arising from the combination of superimposed microstructures, as explained above.

In other embodiments (not shown), forming a microstructure may comprise providing a mould having concavo-convex structures that are configured to form the grooves of the microstructure, combining the support with the mould, and injecting a polymeric material in the space between the mould and the support. In such embodiments, the support and microstructure may be formed at the same time and/or integrally, for example, using simultaneous injection moulding or injection-compression moulding of plastics. The mould advantageously has a surface roughness Ra below about 100 nm, preferably below about 50 nm, below about 20 nm, below about 10 nm, or below about 5 nm. In embodiments, the mould has a flatness deviation $d_f$ below about 2 μm, preferably below about 1 μm, below about 800 nm, below about 500 nm or below 200 nm.

Alternatively, forming a microstructure may comprise providing a microstructured reflective metallic sheet having concavo-convex structures configured to form the grooves of the microstructure, and assembling the microstructured reflective metallic sheet with the support using a polymeric material that substantially fills the grooves between the triangular structures of the metallic sheet. A microstructured reflective metallic sheet may be provided by deep drawing a metallic sheet to create concavo-convex structures, such as, for example, triangular structures. Beneficially, the microstructured reflective metallic sheet has a surface roughness Ra below about 100 nm, preferably below about 50 nm, below about 20 nm, below about 10 nm, or below about 5 nm. Beneficially, the microstructured reflective metallic sheet has a flatness deviation $d_f$ below about 2 μm, preferably below about 1 μm, below about 800 nm, below about 500 nm or below about 200 nm. The concavo-convex structures may have a height of between about 30 μm and about 200 μm.

According to a further aspect of the present disclosure, a UV curable resin composition is provided which is suitable for making a decorative structure as described. The UV curable resin composition comprises acrylate and/or methacrylate monomers and a photoinitiator, wherein the composition has an aromatic content of at least about 50%. Advantageously, the use of UV curable resin compositions with a high aromatic content may be associated with high refraction indices and high dispersion, compared to commonly used nanoimprint resins. This may be particularly advantageous for use in creating decorative structures according to the invention, where high dispersion creates desirable optical effects.

In embodiments, the curable resin composition has a viscosity below about 3 Pas. In embodiments, the composition has a viscosity between about 500 mPas and about 3,000 mPas. In embodiments, the curable resin composition has a viscosity between about 500 mPas and about 1,500 mPas, preferably between 500 mPas and 1,000 mPas, such as e.g. between 700 mPas and 1,000 mPas. Advantageously, resins with a pre-cured viscosity in the above ranges may be conveniently applied as thin uniform coating films. For example, the resin compositions according to the invention may have a pre-cured viscosity such that the compositions can be applied in layers of between about 15 μm and about 200 μm. This may be particularly advantageous for use in nanoimprint lithography.

In embodiments, the composition comprises methacrylate monomers as a main component. For example, methacrylate monomers may form at least about 90%, at least about 92%, at least about 94%, at least about 96%, at least about 97% or at least about 98% of the curable resin composition by weight. Without wishing to be bound by theory, it is believed that methacrylates are less likely to be a cause of skin irritation than acrylates, and as such may be desirable in some applications. In embodiments, the composition comprises acrylate monomers as a main component. For example, acrylate monomers may form at least about 90%, at least 92%, at least 94%, at least 96% or at least 98% of the curable resin composition. Without wishing to be bound by theory, it is believed that faster polymerisation speeds can be obtained using acrylate monomers than methacrylate monomers, due to higher radical polymerisation reactivity of acrylates. As such, acrylate monomers may be associated with higher production speeds, and may be advantageous in some applications.

In embodiments, the resin composition, when cured, results in a polymer material that is transparent. In embodiments, the resin composition, when cured, results in a polymer material that has high optical dispersion. In embodiments, a polymer material with high optical dispersion has a low Abbe number, such as an Abbe number below about 60, preferably below about 50, below about 40 or below about 35.

In embodiments, the photoinitiator is a photoinitiator with a high UV-A absorption coefficient, such as e.g. at least about 300, at least about 400, and preferably at least about 500 L/(mol*cm) at wavelengths between 350 nm and 400 nm. In embodiments, the photoinitiator is a photoinitiator with low absorption in the visible wavelengths, such as e.g. below about 300 L/(mol*cm), below about 250 L/(mol*cm), and preferably below about 200 L/(mol*cm) at wavelengths between 400 and 700 nm. Preferably, the photoinitiator is liquid at room temperature. Advantageously, high absorption in the UV-A range may contribute to a rapid polymerisation, while low absorption in the visible range may make the resin composition more stable and convenient to manipulate prior to exposure to UV for curing.

Suitable photoinitiators for use according to the invention include ethyl(2,4,6-trimethylbenzoyl)-phenyl phosphinate (cas no. 84434-11-7, TPO-L, available from IGM), blends of bis(2,6-dimethoexybenzoyl)-2,4,4-trimethyl pentylphosphineoxide and 1-hydroxy-cyclohexyl-phenyl-ketone (such as that available as Genocure LTM), 2,4,6-Trimethylbenzoyldiphenylphosphine oxide (available as Genocure TPO), Benzil dimethyl ketal 2,2-methoxy-1,2-diphenyl ethanone (available as Genocure BDK, also available as Irgacure 651), 2-hydroxy-2-methyl-1-phenyl-propan-1-one (available as Genocure DMHA), 1-hydroxycyclohexyl phenyl ketone (available as Irgacure 184), and blends of 1-hydroxycyclohexylphenyl-ketone and benzophenone (such as that available as Additol BCPK). Amongst these, compounds such as those in TPO-L, Irgacure 184, DMHA and Additol BCPK may be advantageous as they may be result in transparent cured resin layers even when the resin layer is as thick as 100 to 200 μm. Further, blends such as that available as Additol BCPK may result in a resin that has increased adhesion to substrates, such as e.g. PET or PE, when cured.

In embodiments, the photoinitiator is present in a concentration of at most about 3% by weight of the curable resin composition. In embodiments, the photoinitiator is present in a concentration of at least about 0.1% by weight of the curable resin composition, preferably between about 0.5 and 3%, such as about 1%, about 1.5% or about 2% of the total weight of the curable resin composition. Advantageously, the amount of photoinitiator may be chosen such that substantially complete crosslinking of the polymer can be achieved in the curing conditions used. Indeed, incomplete crosslinking may reduce the stability (e.g. mechanical stability) of the cured resin, and non-reacted groups that may still be present in the non-fully cured resin may cause e.g. skin irritation. As the skilled person would understand, the degree to which complete crosslinking of the polymer is achieved may depend on the concentration of the photoinitiator as well as the emission spectrum and power of the UV lamp used, and the exposure time. As such, depending on the particular curing process used, the optimal amount of photoinitiator may vary. The present inventors have found that the above ranges of photoinitiator concentrations typically resulted in adequate crosslinking at least in their curing process (below 1s polymerisation time upon UV exposure $1 W/cm^2$ at wavelengths between 350 nm and 400 nm, such as 365 nm to 395 nm). As the skilled person would understand, including concentrations of photoinitiator that are higher than necessary for complete cross linking may result in the presence of unbound photoinitiator in the cured resin. This may be disadvantageous as it reduces the amount of "useful" (i.e. curable) polymer in the resin composition, and represents a waste of photoinitiator.

In embodiments, the (meth)acrylate monomers represent at least about 90% by weight of the curable resin composition, preferably about 95%, about 96%, about 97%, about 98% of about 99% of the total weight of the curable resin composition. In embodiments, the composition comprises about 98% by weight of the curable resin composition of (meth)acrylate monomers, and about 2% by weight of the curable resin composition of photoinitiator. In embodiments, the composition comprises at least about 96% by weight of the curable resin composition of (meth)acrylate monomers, and at most about 3% by weight of the curable resin composition of photoinitiator. In embodiments, the composition comprises at least about 97% by weight of the curable resin composition of (meth)acrylate monomers, and at most about 2% by weight of the curable resin composition of photoinitiator.

In embodiments, the composition comprises a first type of (meth)acrylate monomers that are at least bifunctional and lead to spatial crosslinking upon curing, and a second type of (meth)acrylate monomers that have very high aromatic content. For example, the second type of (meth)acrylate monomers may have an aromatic content of at least about 50%, at least about 60% or at least about 70%. In embodiments, substantially all of the (meth)acrylate monomers in the composition are either of the first or second type. In embodiments, the second type of (meth)acrylate monomers may form chains (i.e. no cross-linking) upon curing. In embodiments, the second type of (meth)acrylate monomers may be monofunctional. Advantageously, the second type of (meth)acrylate monomers may have a viscosity at room temperature below that of the first type of (meth)acrylate monomers. In embodiments, the second type of (meth) acrylate monomers may have a viscosity at room temperature below about 200 mPas. In embodiments, the first type of (meth)acrylate monomers may have a viscosity at room temperature above about 1,000 mPas. In embodiments, the second type of (meth)acrylate monomers may have a refractive index of at least about 1.51.

The present inventors have discovered that by combining (meth)acrylate monomers of the first and second type, it was possible to obtain a UV curable resin composition that, when cured, has good thermal, mechanical and/or chemical stability combined with a high refractive index and high dispersion, and that prior to curing, has adequate viscosity for applying as a thin layer (for example, by roller based coating). Without wishing to be bound by theory, it is believed that the (meth)acrylate monomers of the first type may contribute to the thermal, mechanical and/or chemical stability of the cured resin, while the (meth)acrylate monomers of the second type may contribute to increasing the refractive index and dispersion of the cured resin, and lowering the viscosity of the uncured resin.

Suitable monomers for use as a second type of monomers may include ortho-phenyl-phenol-ethyl-acrylate (available as MIWON Miramer M1142, refractive index RI(ND25)=1,577, viscosity at 25° C.=110-160 mPas) and 2-phenoxy-ethyl-acrylate (available as MIWON Miramer M140, refractive index RI(ND25)=1,517, viscosity at 25° C.=10-20 mPas). Further suitable monomers for use as a second type of monomers may include phenylepoxyacrylate (available as MIRAMER PE 110), benzylacrylate (available as MIRAMER M1182), benzylmethacrylate (available as MIRAMER M1183), phenoxybenzylacrylate (available as MIRAMER M1122) and 2-(phenylthio)ethylacrylate (available as MIRAMER M1162). In preferred embodiments, the composition comprises ortho-phenyl-phenol-ethyl-acrylate as the only monomer of the second type.

In embodiments, the first type of (meth)acrylate monomers may have a refractive index of at least about 1.51. Suitable monomers for use as a first type of monomers include ethoxylated(3)bisphenol-A-dimethacrylate (available as Sartomer SR348C, refractive index RI(ND25)=1,53), and aromatic urethane diacrylate oligomers such as Allnex Ebecryl 210 (E210) (refractive index approx. RI(ND25)=1,52). Further suitable monomers for use as a first type of monomers include ethoxylated (2)bisphenol-A-dimethacrylate (available as Sartomer SR348L, viscosity at 60°=1,600 mPas, refractive index similar to that of ethoxylated(3)bisphenol-A-dimethacrylate), ethoxylated (3)bisphenol-A-diacrylate (available as Sartomer SR349 or Miwon MIRAMER 244), ethoxylated (4)bisphenol-A-diacrylate (available as Miwon MIRAMER M240), bisphenol-A-diepoxyacrylate (available as Miwon MIRAMER PE210, viscosity at 60°=5000 mPas), bisphenol-A-diepoxymethacrylate (available as Miwon MIRAMER PE250, viscosity at 60°=5,000 mPas). In preferred embodiments, the first type of (meth)acrylate monomers may be selected to have a viscosity at 60° below about 3,000 mPas, preferably below about 2,000 mPas. In preferred embodiments, the curable resin composition comprises ethoxylated(3)bisphenol-A-dimethacrylate as the only monomer of the first type.

In embodiments, the curable resin composition comprises one or more (meth)acrylate monomers of the first type and one or more (meth)acrylate monomers of the second type. In embodiments, the UV curable resin composition comprises proportions of (meth)acrylate monomers of the first and second type between about 1:1 and 1:3 by weight (i.e. one part monomers of the first type to between 1 and 3 parts monomers of the second type); such as about 1:2. In other words, the UV curable resin composition may comprise at least as much of the monomers of the second type (by weight) as of the monomers of the first type, and in some embodiments a higher amount by weight of the monomers of the second type compared to the amount by weight of monomers of the first type. In embodiments, the curable resin composition comprises at least about 15%, such as at least about 20% by weight (meth)acrylate monomers of the first type, and (meth)acrylate monomers of the second type up to a total percentage by weight of (meth)acrylate monomers of at least about 90%, at least 95%, at least 96%, at least 97%, or about 98% by weight. In embodiments, the curable resin composition comprises between 10 and 35% by weight of (meth)acrylate monomers of the first type, preferably between about 15% and about 30% by weight of the curable resin composition, such as about 25%. In embodiments, the curable resin composition comprises between about 35% and about 85% by weight of (meth) acrylate monomers of the second type, such as at least about 40% by weight of the curable resin composition. As the skilled person would understand, the proportions of monomers of the first and second types may be adjusted in order to adapt the exact properties of the curable resin composition and/or the cured resin to the intended use. For example, within the ranges described, it may be advantageous to increase the proportion of monomers of the first type to obtain a stiffer and chemically more stable cured resin, and conversely the proportion of monomers of the first type may be reduced to obtain a more flexible/elastic (albeit possibly chemically less stable) cured resin.

In embodiments, the UV curable resin composition has a curing (polymerisation) time of 1 second or less when exposed to UV light in the appropriate wavelength range (e.g. 350-400 nm, such as 365/395 nm) with a power of at least 1 W/cm$^2$.

In embodiments, the UV curable resin composition comprises ethoxylated (3)bisphenol-A-dimethacrylate (first type of monomer) and ortho-phenyl-phenol-ethyl-acrylate (second type of monomer) as major components. In some such embodiments, the UV curable resin composition comprises a combined amount of ethoxylated (3)bisphenol-A-dimethacrylate and ortho-phenyl-phenol-ethyl-acrylate of at least about 90%, at least 92%, at least 93%, at least 94%, 95%, 96%, 97%, 98% or 99% by weight of the curable resin composition. In some such embodiments, the proportion of ethoxylated (3)bisphenol-A-dimethacrylate to ortho-phenyl-phenol-ethyl-acrylate is between about 1:1 and 1:3; such as about 1:2 (i.e. the amount by weight of ortho-phenyl-phenol-ethyl-acrylate is twice the amount by weight of ethoxylated (3)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (2)bisphenol-A-dimethacrylate (first type of monomer) and ortho-phenyl-phenol-ethyl-acrylate (second type of monomer) as major components. In some such embodiments, the UV curable resin composition comprises a combined amount of ethoxylated (2)bisphenol-A-dimethacrylate and ortho-phenyl-phenol-ethyl-acrylate of at least about 90%, at least 92%, at least 93%, at least 94%, 95%, 96%, 97%, 98% or 99% by weight of the curable resin composition. In some such embodiments, the proportion of ethoxylated (2)bisphenol-A-dimethacrylate to ortho-phenyl-phenol-ethyl-acrylate is between about 1:1 and 1:3; such as about 1:2 (i.e. the amount by weight of ortho-phenyl-phenol-ethyl-acrylate is twice the amount by weight of ethoxylated (2)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (3)bisphenol-A-dimethacrylate (first type of monomer) and 2-phenoxyethyl-acrylate (second type of monomer) as major components. In some such embodiments, the UV curable resin composition comprises a combined amount of ethoxylated (3)bisphenol-A-dimethacrylate and 2-phenoxyethyl-acrylate of at least 90%, at least 92%, at least 93%, at least 94%, 95%, 96%, 97%, 98% or 99% by weight of the curable resin composition. In some such embodiments, the proportion of ethoxylated (3)bisphenol-A-dimethacrylate to 2-phenoxyethyl-acrylate is between about 1:1 and 1:3, preferably about 1:2 (I.e. the amount by weight of 2-phenoxyethyl-acrylate is twice the amount by weight of ethoxylated (3)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (2)bisphenol-A-dimethacrylate (first type of monomer) and 2-phenoxyethyl-acrylate (second type of monomer) as major components. In some such embodiments, the UV curable resin composition comprises a combined amount of ethoxylated (2)bisphenol-A-dimethacrylate and 2-phenoxyethyl-acrylate of at least about 90%, at least 92%, at least 93%, at least 94%, 95%, 96%, 97%, 98% or 99% by weight of the curable resin composition. In some such embodiments, the proportion of ethoxylated (2)bisphenol-A-dimethacrylate to 2-phenoxyethyl-acrylate is between 1:1 and 1:3; such as about 1:2 (i.e. the amount by weight of 2-phenoxyethyl-acrylate is twice the amount by weight of ethoxylated (2)bisphenol-A-dimethacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the UV curable resin composition comprises ethoxylated (3)bisphenol-A-diacrylate (first type of monomer) and ortho-phenyl-phenol-ethyl-acrylate (second type of monomer) as major components. In some such embodiments, the UV curable resin composition comprises a combined amount of ethoxylated (3)bisphenol-A-diacrylate and ortho-phenyl-phenol-ethyl-acrylate of at least about 90%, at least 92%, at least 93%, at least 94%, 95%, 96%, 97%, 98% or 99% by weight of the curable resin composition. In some such embodiments, the proportion of ethoxylated (3)bisphenol-A-diacrylate to ortho-phenyl-phenol-ethyl-acrylate is between about 1:1 and 1:3, such as about 1:2 (I.e. the amount by weight of ortho-phenyl-phenol-ethyl-acrylate is twice the amount by weight of ethoxylated (3)bisphenol-A-dicrylate). In some such embodiments, the UV curable resin composition further comprises ethyl(2,4,6-trimethylbenzoyl)-phenyl phosphinate,such as in a concentration of about 0.1 to 2% by weight of the curable resin composition. In some such embodiments, the UV curable resin composition further comprises a surfactant, such as e.g. 1H,1H,5H-Octafluoropentyl-acrylate or a polyether-modified poly-dimethylsiloxane, as discussed below.

In embodiments, the UV curable resin composition comprises ethoxylated (3)bisphenol-A-diacrylate (first type of monomer) and 2-phenoxyethyl-acrylate (second type of monomer) as major components. In some such embodiments, the UV curable resin composition comprises a combined amount of ethoxylated (3)bisphenol-A-diacrylate and 2-phenoxyethyl-acrylate of at least about 90%, at least 92%, at least 93%, at least 94%, 95%, 96%, 97%, 98% or 99% by weight of the curable resin composition. In some such embodiments, the proportion of ethoxylated (3)bisphenol-A-diacrylate to 2-phenoxyethyl-acrylate is between about 1:1 and 1:3; such as about 1:2 (i.e. the amount by weight of 2-phenoxyethyl-acrylate is twice the amount by weight of ethoxylated (3)bisphenol-A-diacrylate). In some such embodiments, the UV curable resin composition further comprises ethyl(2,4,6-trimethylbenzoyl)-phenyl phosphinate, such as in a concentration of about 0.1 to 2% by weight of the curable resin composition. In some such embodiments, the UV curable resin composition further comprises a surfactant, such as e.g. 1H,1H,5H-octafluoropentyl-acrylate or a polyether-modified poly-dimethylsiloxane, as discussed below.

In embodiments, the resin composition has a surface energy below about 30 $J/m^2$. In embodiments, the resin composition further comprises a surfactant, preferably an acrylate functionalised surfactant. A surfactant may advantageously reduce adhesion between the surface of the resin and a surface used to impart structure to the resin, such as e.g. an imprint stamp. In embodiments, the surfactant is beneficially chosen such that when the resin composition is applied on a polymeric surface such as PE or PET, the surfactant segregates more at the exposed resin surface than at the polymer-resin interface. In embodiments, the surfactant does not reduce the transparency of the cured resin composition. In embodiments, the surfactant may be used in a concentration below about 2% by weight of the curable resin composition, such as between about 0.1% and 2% by weight of the curable resin composition, or between about 0.5% and about 1% by weight of the curable resin composition, such as at most about 1% by weight of the curable resin composition. Suitable surfactants for use according to the invention include 1H,1H,2H,2H-perfluorooctyl acrylate (CAS 17527-29-6, available as Fluowet® AC600), 1H,1H,5H-octafluoropentyl-acrylate (available as Viscoat 8F from OSAKA ORGANIC CHEMICAL INDUSTRY LTD), (PFPE)-urethane acrylate (typically available in solution, such as in a solvent comprising a mixture of ethyl acetate and butyl acetate (for example 1:1 by weight), such as Fluorolink AD1700), polyether-modified poly-dimethylsiloxane (available, for example, as BYK-UV 3510), 4-(1,1,3,3-Tetramethylbutyl)-phenyl-poly-ethylene glycol (available, for example, as Triton® X-100). Advantageously, surfactants for use according to the invention are not solvent-based. Particularly beneficial surfactants for use according to the invention include 1H,1H,2H,2H-perfluorooctyl acrylate (CAS 17527-29-6, available as Fluowet® AC600) and 1H,1H,5H-octafluoropentyl-acrylate (available as Viscoat 8F from OSAKA ORGANIC CHEMICAL INDUSTRY LTD). These surfactants are advantageously clear in the above-mentioned concentrations, and enable the production of a cured polymer on a support surface (such as e.g. a PET or PE surface) that shows satisfactory adhesion to the surface.

In embodiments, the composition does not comprise an anti-adhesion additive, such as a surfactant. Compositions without anti-adhesion additives may advantageously result in good adhesion between the resin when cured and a support on which the resin was cured. In particular, good adhesion properties may be advantageous when the resin is applied on a support to form a composite body when cured, and the bond between the cured resin and the support is preferably resistant to exposure to temperature changes and/or humidity. In embodiments, compositions without an anti-adhesion additive may be particularly suitable for use in combination with glass or glass-like substrates.

Table 1 below shows formulae for compounds mentioned above, that may be used as the first or second type of (meth)acrylate monomers according to the disclosure, as photoinitiators, or as surfactants, as the case may be.

TABLE 1 compounds for use as ingredients of UV curable resins according to the disclosure.

| Formula | Name | Use |
| --- | --- | --- |
| 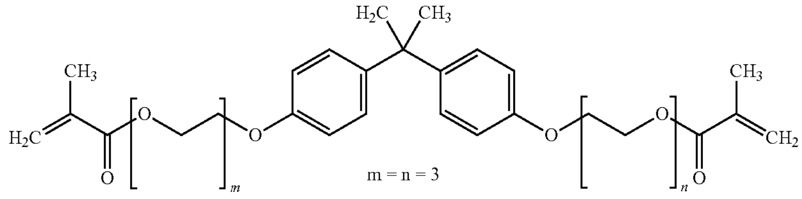 m = n = 3<br>Formula I | ethoxylated(3)bisphenol-A-dimethacrylate | first type of monomer |

TABLE 1-continued compounds for use as ingredients of UV curable resins according to the disclosure.

| Formula | Name | Use |
|---|---|---|
| 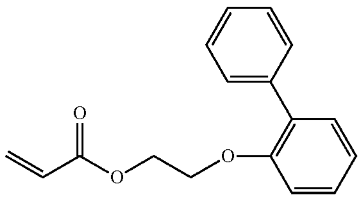 Formula II | ortho-phenyl-phenol-ethyl-acrylate | second type of monomer |
| 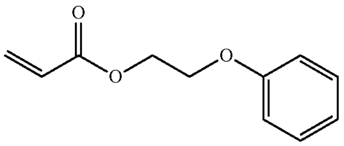 Formula III | 2-phenoxyethyl-acrylate | second type of monomer |
| 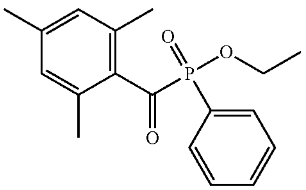 Formula IV | TPO-L | photoinitiator |
| 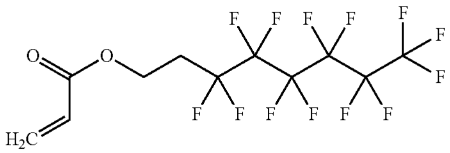 Formula V | 1H,1H,2H,2H-perfluorooctyl acrylate | surfactant |
| 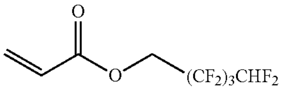 Formula VI | 1H,1H,5H-octafluoropentyl-acrylate | surfactant |
| 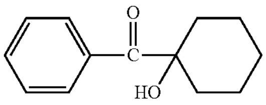 Formula VII | additol BCPK | photoinitiator |
| 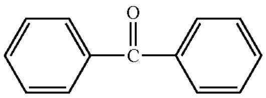 Formula VIII | 1-hydroxy-cyclohexylphenyl-ketone & benzophenone | photoinitiator |

The decorative structures according to the invention are particularly suitable for use as decorative elements for use on garments, wearables, fashion accessories, etc. where the aesthetic potential combined with the light weight, low profile and flexibility of the decorative structures of the invention are important. As such, the invention also encompasses a garment comprising a decorative structure as described. For example, the garment may be a clothing accessory such as shoes, a hat, sunglasses, glasses, bags, jewellery such as a bracelet, necklace or watch, an electronic wearable such as an activity tracker, etc. or a piece of clothing such as a shirt, jacket, jumper etc.

Other variations of the invention will be apparent to the skilled person without departing from the scope of the appended claims.

EXAMPLES

Example 1

Figure 1A:
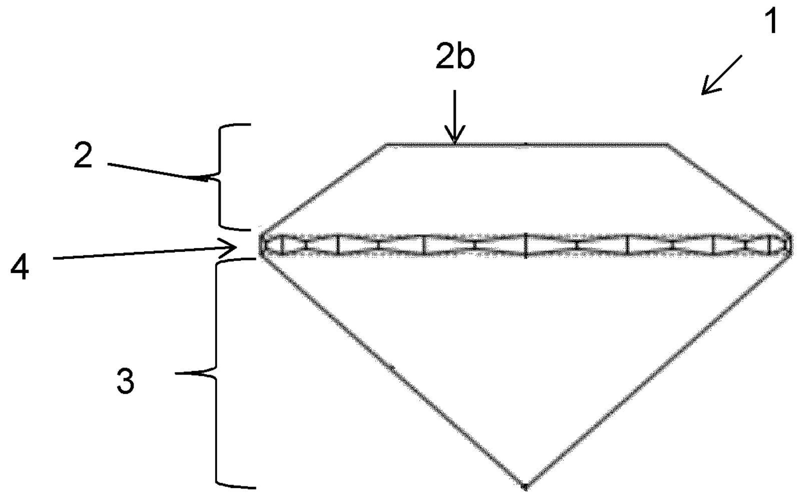
FIGS. 1A, 1B and 1C show schematic views of a gemstone according to the prior art, seen from the side (FIG. 1A), the top (FIG. 1B) and the bottom (FIG. 1C)
Figure 1B:
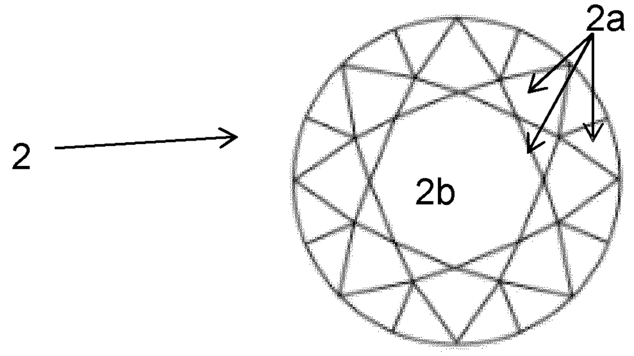
Figure 1C:
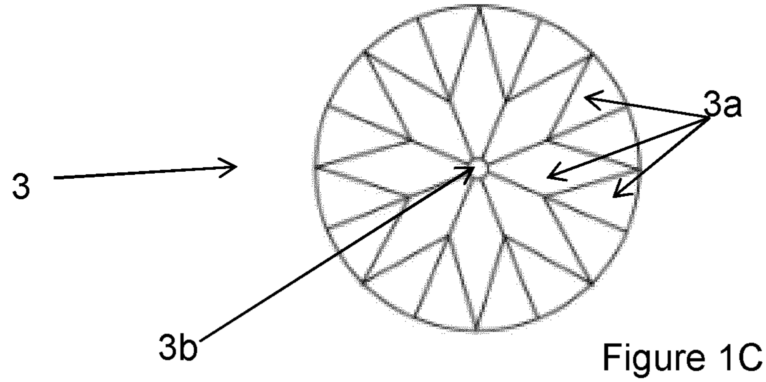

In this example, the optical properties of a prior art crystal cut (brilliant cut as shown in FIG. 1) were analysed.

Figure 8A:
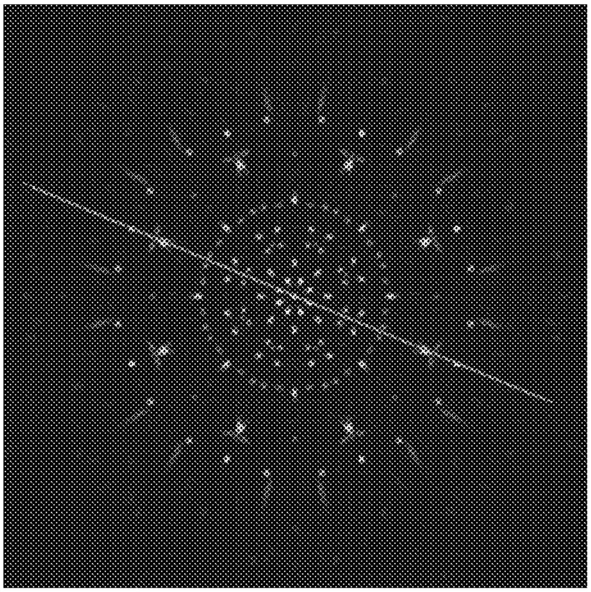
FIGS. 8A, 8B and 8C show data representative of a cut crystal (brilliant cut as shown on FIG. 1) according to the prior art.
Figure 8B:
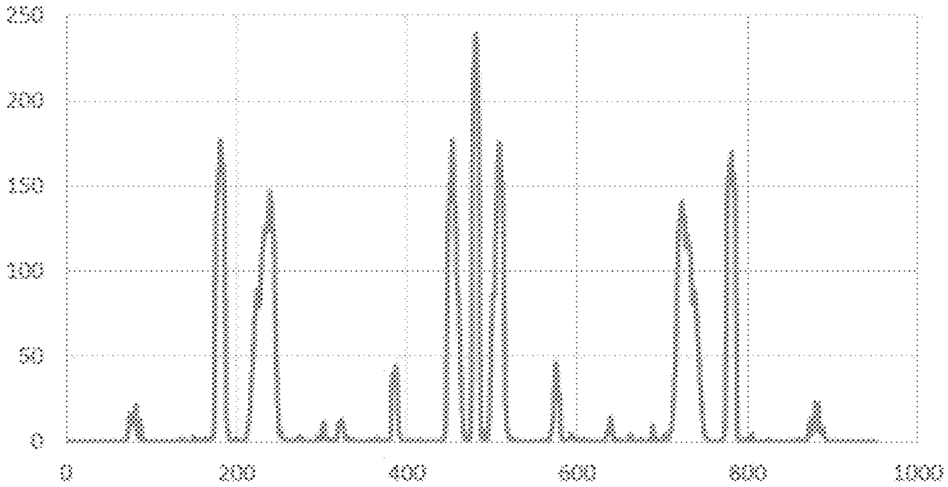
Figure 8C:
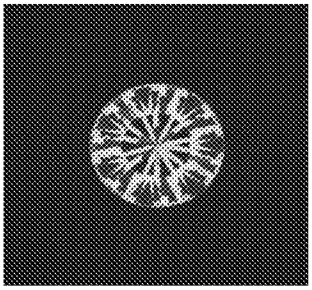

FIG. 8A shows a fire map of the crystal, i.e. reflections from the crystal under spot illumination perpendicular to the table of the crystal, as observed on a screen at a 50 cm distance to the stone parallel to the table of the crystal. FIG. 8B is a graph of brightness across a cross section of the fire map as indicated on FIG. 8A. The data on FIG. 8B is obtained by extracting the combined value (on a greyscale from 0 to 255 arbitrary units) from an RGB camera sensor along the cross section indicated on FIG. 8A (y axis), and plotting this against the lateral position along the cross section by pixel number on the sensor (x axis). FIG. 8C shows an image of the cut crystal revealing the strong contrast between light and dark areas. The data shown in FIG. 8C is obtained using an assembly as described in WO 2015/02752 A1, which is incorporated herein by reference.

FIGS. 8A to 8C show that brilliant crystal cuts are associated with a clearly visible pattern of coloured reflections (fire, see FIG. 8A), strong scintillation due to a combination of sparkle arising from a marked distribution of faceted reflections (see FIG. 8B) and pattern arising from a clear contrast of light and dark areas (see FIG. 8C). The decorative structures of the invention attempt to emulate some or all of these properties without relying on bulky convex geometries.

Example 2

In this example, the optical properties of various embodiments of the decorative structures of the invention were studied.

Figure 9A:
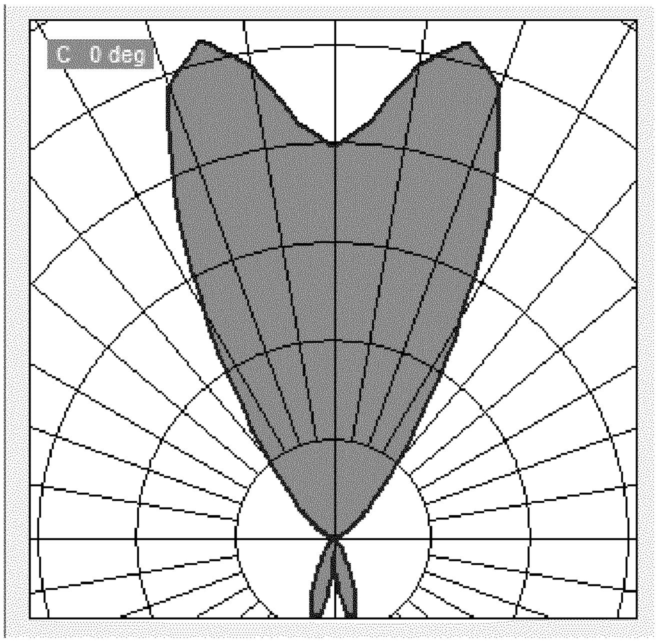
FIGS. 9A and 9B show simulations of the reflection of light by exemplary decorative structures according to the invention, when the structures are exposed to light perpendicular to the first planar major surface of the support.
Figure 9B:
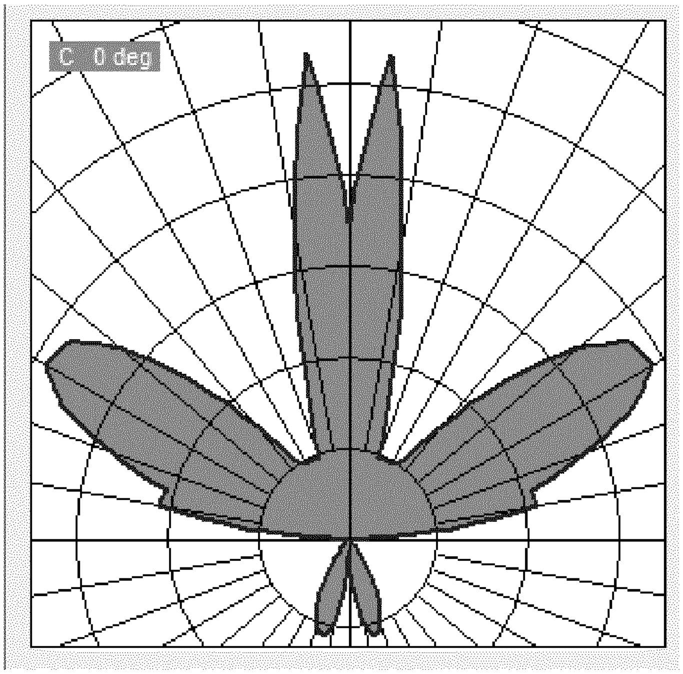

FIGS. 9A and 9B show simulations of the reflection of light by exemplary decorative structures according to the invention, when the structures are exposed to light perpendicular to the first planar major surface of the support. FIG. 9A shows the angles of light reflection using embodiments as shown on FIG. 2A; and FIG. 9B shows the angles of light reflection using embodiments as shown on FIG. 2B. Shaded areas indicate angles from the normal (vertical line, which is the direction of incidence of the light) where light is expected to be reflected by the at least partially reflective layer of the decorative structure; the horizontal line corresponds to the plane of the at least partially reflective layer; and the shaded areas below the horizontal lines correspond to reflections through the edges of the decorative structure.

FIG. 9A shows that in the configuration of FIG. 2A, the deviation angles caused by the microstructure are relatively low. This is thought to be because the refraction on the interface between air and the material of the microstructure only causes a small ray deviation, with subsequent reflection at a planar mirror layer that doubles this deviation. FIG. 9B shows that in the configuration of FIG. 2B, the deviation angles caused by the microstructure are comparatively high. This is thought to be because the refraction on the interface between air and the material of the support only causes a small ray deviation, but subsequent reflection at the inclined mirrored facets of the microstructure cause this deviated light to be reflected at broader angles. This data indicates that providing an at least partially reflective layer on the microstructure rather than on a planar surface of the support may be particularly advantageous.

Figure 10:
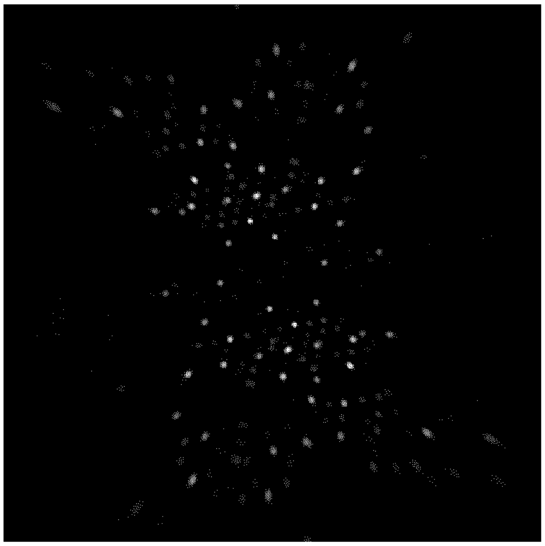
FIG. 10 shows a fire map of an exemplary decorative structure according to the invention, when observed parallel to the plan of the support; the decorative structure has a configuration as shown on FIG. 2B, with a single microstructure resulting from a 2-fold asymmetrical arrangement of grooves off-set from each other at an angle of 135°.

FIG. 10 shows a fire map of an exemplary decorative structure according to the invention, when observed parallel to the plane of the support. The decorative structure has a configuration as shown on FIG. 2B, with a single microstructure resulting from a 2-fold asymmetrical arrangement of grooves (as shown on FIG. 5B) wherein the grooves are asymmetrical triangular grooves with angles of 11° and 5.6° between the walls of the grooves and the first planar major surface support, and an angle of 135° between the two sets of grooves. The data of this figure shows that 2-fold asymmetrical configurations result in large dark areas on the fire map, which will appear as dull regions on visual inspection.

Figure 11A:
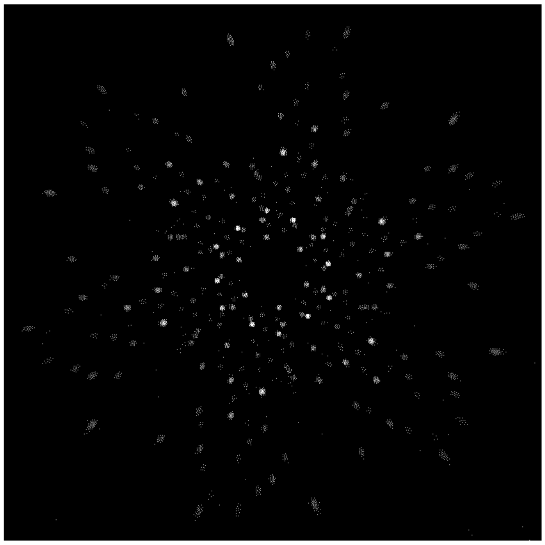
FIGS. 11A and 11B show fire maps of an exemplary decorative structure according to the invention, when observed parallel to the plane of the support (FIG. 11A), and perpendicular to the plane of the support (FIG. 11B); the decorative structure has a configuration as shown on FIG. 2B, with a single microstructure resulting from a 3-fold symmetrical arrangement of grooves with angles of 11.0° and 5.6°; the observed fire on FIG. 11A was quantified as 39.6%, and the side fire was quantified on FIG. 11B as 0.4%.
Figure 11B:
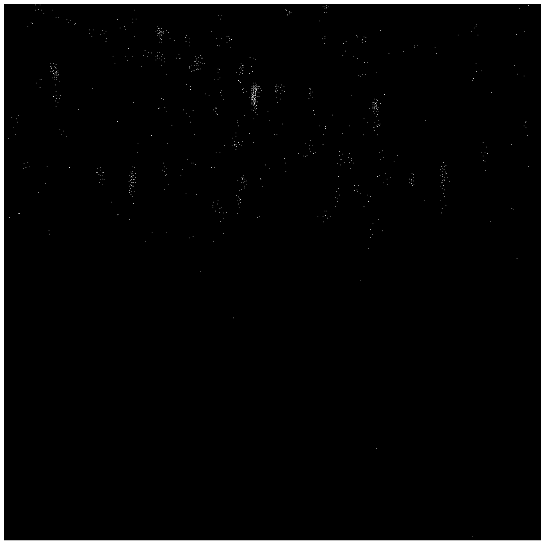

FIGS. 11A and 11B show fire maps of an exemplary decorative structure according to the invention, when observed parallel to the plane of the support (FIG. 11A), and perpendicular to the plane of the support (FIG. 11B). The decorative structure has a configuration as shown in FIG. 2B, with a single microstructure resulting from a 3-fold symmetrical arrangement of grooves (as shown on FIG. 5C) wherein the grooves are asymmetrical triangular grooves with angles of 11.0° and 5.6° between the walls of the grooves and the support, for all grooves, and angles of 60° between the sets of grooves. The observed fire in FIG. 11A was quantified as 39.6%, and the side fire was quantified in FIG. 11B as 0.4%. Fire can be quantified from a fire map by pixelwise examination of the fire map: the colour saturation S of each pixel is calculated in HIS-colour space and multiplied by its illuminance. The sum over all pixels of the fire map is the fire value. The fire value is 0 for a completely white light as colour saturation S would be 0, and 100% for completely saturated light. The data on this figure shows that good fire values when viewed from the top can be obtained using such a 3-fold symmetrical configuration, with comparatively fewer dark areas than with a two-fold symmetrical configuration as shown on FIG. 10.

Figures 12A, 12B:
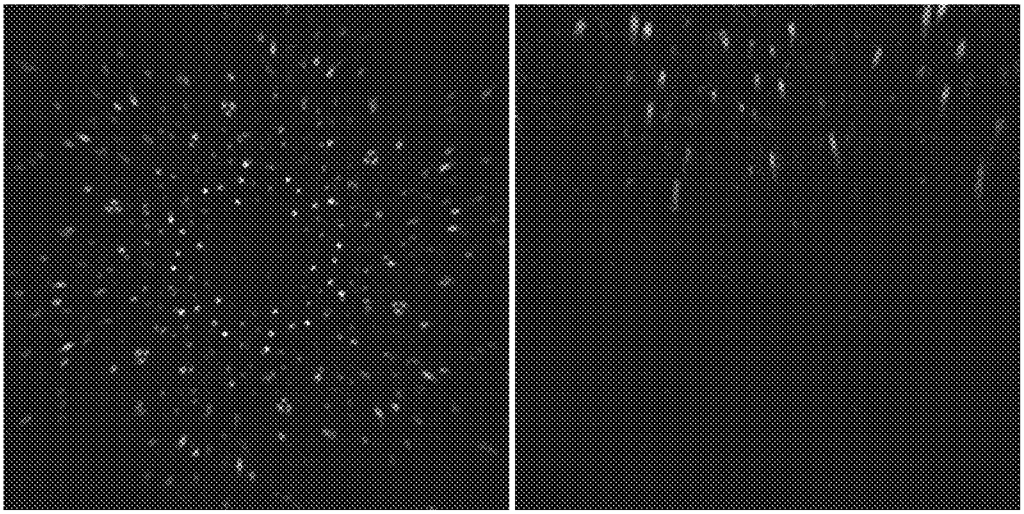
FIGS. 12A and 12B shows fire maps of an exemplary decorative structure according to the invention, when observed parallel to the plane of the support (FIG. 12A) and perpendicular to the plane of the support (FIG. 12B); the decorative structure has a configuration as shown on FIG. 2B, with a single microstructure resulting from a 3-fold symmetrical arrangement of grooves with angles of 15.0° and 8.6°; the observed fire on FIG. 12A was quantified as 40.1%, and the side fire was quantified on FIG. 12B as 3.7%.

FIGS. 12A and 12B shows fire maps of an exemplary decorative structure according to the invention, when observed parallel to the plane of the support (FIG. 12A) and perpendicular to the plane of the support (FIG. 12B). The decorative structure has a configuration as shown on FIG. 2B, with a single microstructure resulting from a 3-fold symmetrical arrangement of grooves (as shown on FIG. 5C) with angles of 15.0° and 8.6°. The observed fire in FIG. 12A was quantified as 40.1%, and the side fire was quantified on FIG. 12B as 3.7%. The data shows that by increasing the angles slightly compared to the configuration of FIGS. 11A, 11B, it is possible to increase the side fire as well as the top fire.

Figure 13:
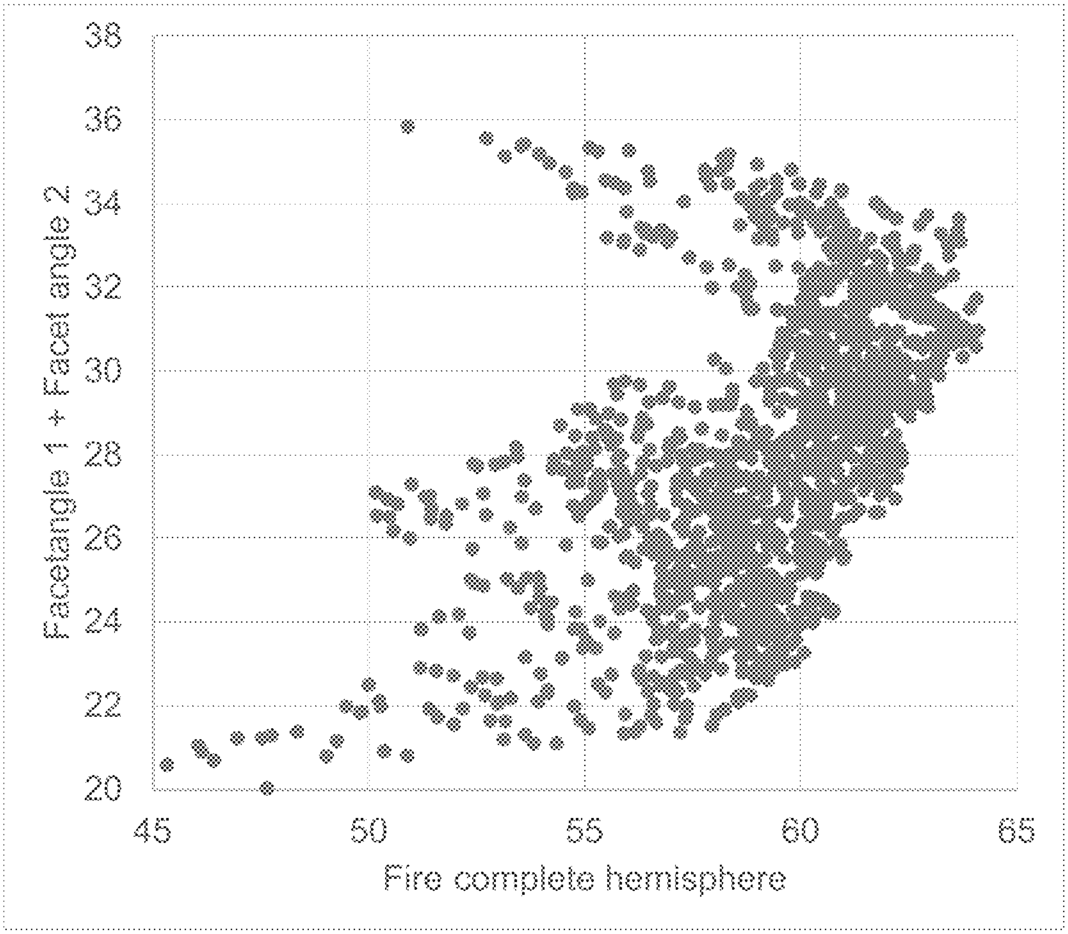
FIG. 13 shows the simulated fire associated with decorative structures according to embodiments of the invention, over a complete hemisphere from the plane of the structure (x-axis), as a function of the sum of the angles of the facets (y-axis); the data shown relates to a decorative structure with a configuration as shown on FIG. 2B, with a single microstructure resulting from a 3-fold symmetrical arrangement of grooves with 2 degrees of freedoms for the angles of the facets (i.e. up to two different angles)

Therefore, the inventors set out to investigate the relationship between the fire and the angles of the facets in a 3-fold symmetrical arrangement of grooves with two different angles of walls. FIG. 13 shows the results of this investigation. The figure shows the simulated fire associated with decorative structures according to embodiments of the invention, over a complete hemisphere from the plane of the structure (x-axis), as a function of the sum of the angles of the facets (y-axis). The data shown relates to a decorative structure with a configuration as shown on FIG. 2B, with a single microstructure resulting from a 3-fold symmetrical arrangement of grooves with 2 degrees of freedoms for the angles of the facets (i.e. up to two different angles). This data shows that fire increases with an increase in combined facet angle to a maximum of 64% at combined angles of about 34°. However, when values of 15.0° and 8.6° (total angle of approx. 24°) were tested (as shown on FIGS. 12A and 12B above), although high values of fires were obtained, some facets were too small to be distinguishable by the naked eye. As the skilled person would understand, the size of the facets depends on the depth of the grooves which in turn depends on the thickness of the microstructure that can be provided. As such, thicker microstructures may be used with the above angles to obtain microstructures with excellent visibility of facets to the naked eye as well as excellent fire properties.

Figure 14A:
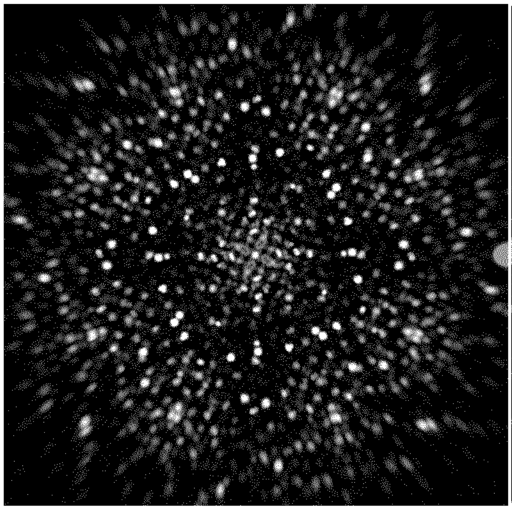
FIGS. 14A and 14B show fire maps of an exemplary decorative structure according to the invention, when observed parallel to the plane of the support (FIG. 14A) and perpendicular to the plane of the support (FIG. 14B); the decorative structure has a configuration as shown on FIG. 3A, the two microstructures are identical and result from a 3-fold symmetrical arrangement of grooves with angles of 13.925°, 10.5° and 2.155°, with a rotation of 25° between the microstructure on the first major surface of the support and the microstructure on the second major surface of the support; on the figures the central large spot is used for orientation and does not form part of the reflection pattern.
Figure 14B:
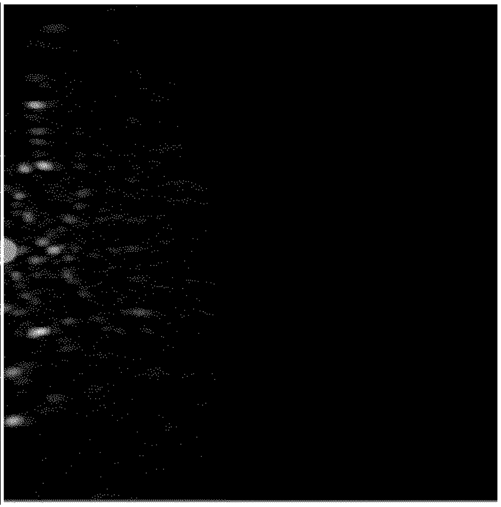

FIGS. 14A and 14B show fire maps of an exemplary decorative structure according to the invention, when observed parallel to the plane of the support (FIG. 14A) and perpendicular to the plane of the support (FIG. 14B). The decorative structure has a configuration as shown on FIG. 3A. Two identical microstructures are overlaid, each of which had a 3-fold symmetrical arrangement of grooves with angles of 13.925°, 10.5° and 2.155°, and a rotation of 25° was employed between the (first) microstructure on the first planar major surface of the support and the (second) microstructure on the second planar major surface of the support. On the figures the central spot is used for orientation and does not form part of the reflection pattern. The top fire was quantified as 37.5% and the side fire was quantified as 5.8%. The data in FIGS. 14A and 14B show that double-sided geometries with symmetrical 3-fold arrangements of grooves can produce a decorative structure that has high fire values without any dark areas in the fire map.

Figure 15:
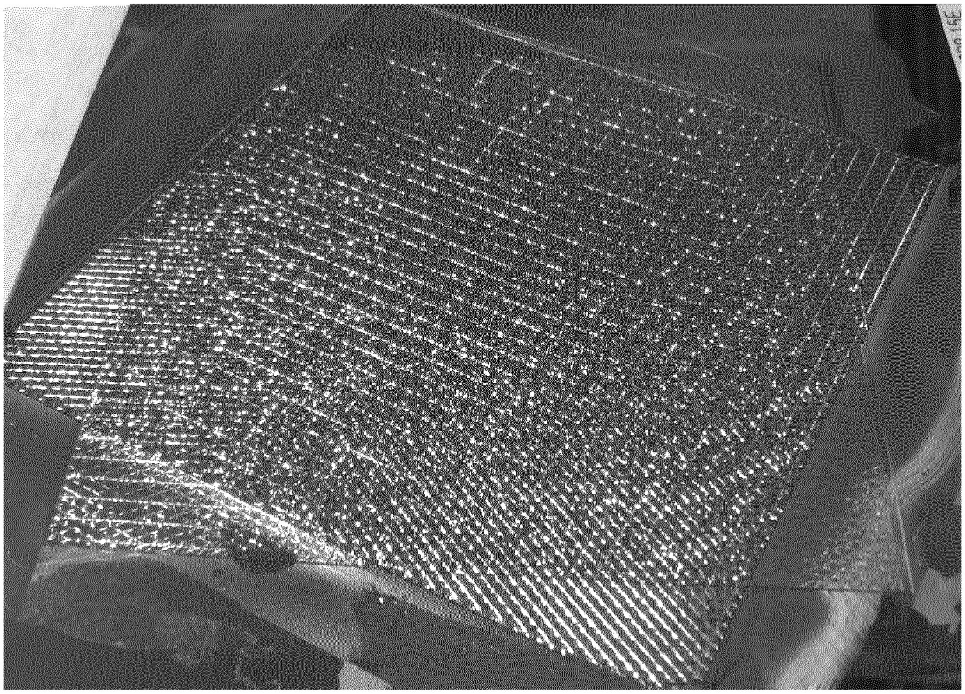
FIG. 15 is a picture of an exemplary decorative structure according to embodiments of the invention—the decorative structure has a configuration as shown on FIG. 3A, the two microstructures are identical and result from a 3-fold symmetrical arrangement of grooves with angles of 13.925°, 10.5° and 2.155°, with a rotation of 25° between the microstructure on the first major surface of the support and the microstructure on the second major surface of the support; an aluminium mirror layer is provided on one of the microstructures, and the support is a PET film.

FIG. 15 is a picture of an exemplary decorative structure according to embodiments of the invention. A support of PET film (PET Melinex ST 505) with a thickness of 125 microns was coated with a layer of UV-curable resin comprising Sartomer SR348c as a major ingredient, in a thickness of about 60 microns. A microstructure arrangement as shown in FIG. 3A was created. The two microstructures were identical and result from a 3-fold symmetrical arrangement of grooves with angles of 15°, with a rotation of 25° between the microstructure on the first planar major surface of the support and the microstructure on the second planar major surface of the support. The resulting microstructures had facets with dimensions of 0.16 mm to 1.34 mm. An aluminium mirror layer of 100 nm was provided on one of the microstructures. This image shows that the resulting decorative structure has advantageous optical properties such as good light return and scintillation.

Example 3

In this example, the inventors investigated the optical properties of various UV curable resins according to the invention and comparative examples. The refractive indices of various cured compositions were obtained by variable angle spectroscopic ellipsometry, using a Xenon lamp between 300 and 1,700 nm and measuring at 55°, 60°, 65°, 70° and 75° angle of incidence. Abbe numbers were calculated from this data as explained above.

Figure 16:
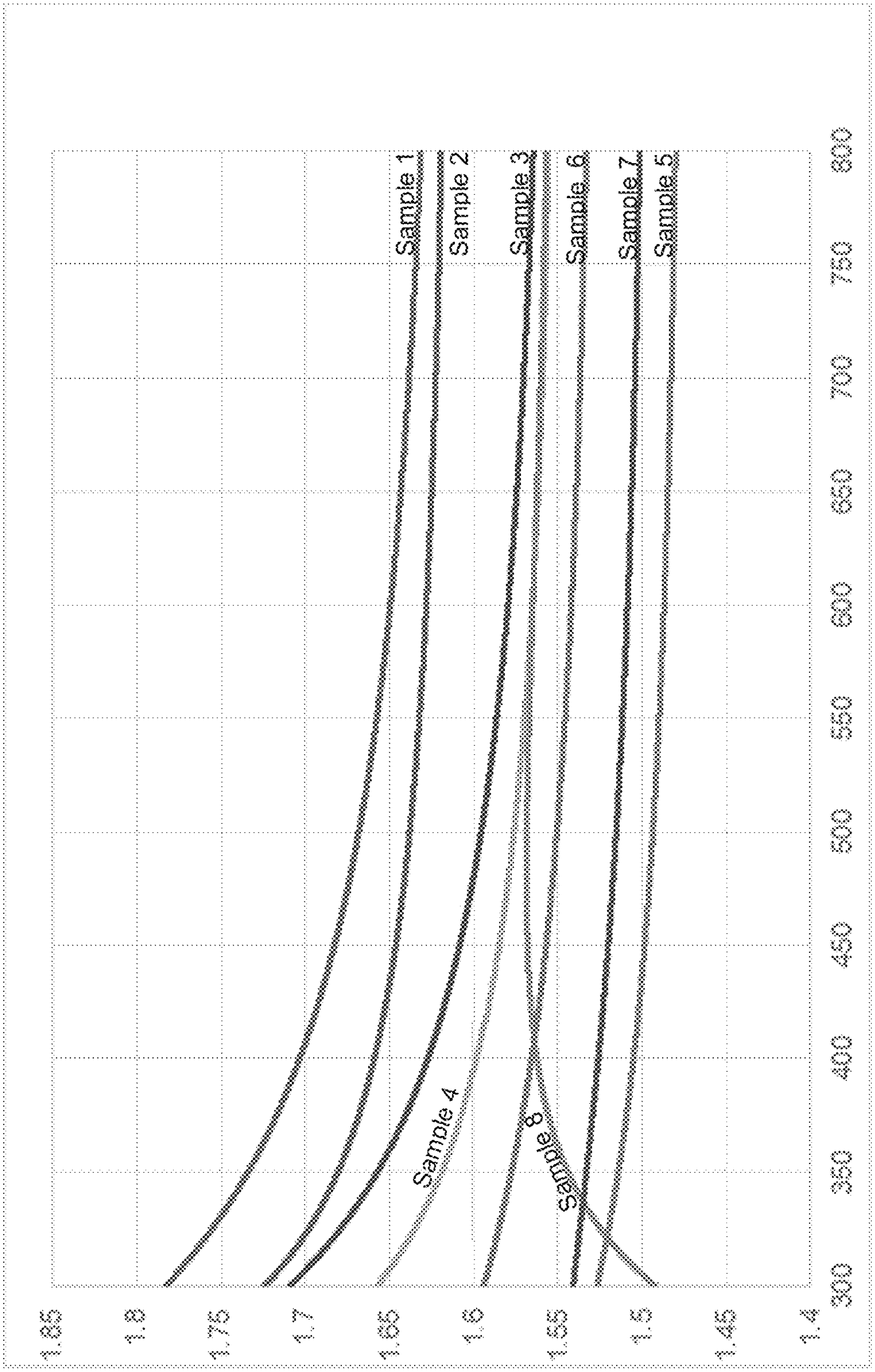
FIG. 16 is a graph showing the refractive index (y-axis) as a function of the wavelength (x-axis) for various cured resins obtained from curable resin compositions according to the invention (samples 1-3 and 6) and comparative examples (samples 4-5 and 7-8).

FIG. 16 is a graph showing the refractive index (y-axis) as a function of the wavelength (x-axis) for various cured resins obtained from curable resin compositions according to the invention (samples 1 to 3) and comparative examples (samples 4 to 8).

The samples are as follows: sample 1: Allnex RX15331 (a nano-composite resin comprising $ZrO_2$)+TPO-L; sample 2: M1142 +TPO-L; sample 3: M1142+SR348+TPO-L (65.3% M1142, 32,7% SR348c, 2% TPO-L, by weight); sample 4: SR348+TPO-L; sample 5: SP1106+TPO-L; sample 6: M2372+M140+TPO-L; sample 7: SC9610+TPO-L; sample 8: E207+M140+TPO-L: where M1142 is Miramer M1142 (ortho-phenyl-phenol-ethyl-acrylate, with a high refractive index but showing no crosslinking and remaining thermoplastic), SR348 is Sartomer SR348c (ethoxylated(3)bisphenol-A-dimethacrylate, with high mechanical, physical and thermal stability), SP1106 is Miramer SP1106 (a hyperbranched acrylate that shows good chemical and mechanical resistance), M2372 is Miramer M2372 (THEICTA, tris(2-hydroxyethyl)isocyanurate-tri-acrylate), M140 is Miramer M140 (2-phenoxyethyl-acrylate, with high refractive index and high flexibility), E207 is Photocryl E207 (an epoxy-acrylate that shows good adhesion to glass), and SC9610 is Miramer SC9610 (a melamine acrylate that shows high hardness and gloss, and good mechanical and chemical resistance).

The data shows that compositions with a high aromatic content according to the invention, such as samples 1, 2 and 3 have low Abbe numbers, whereas compositions that do not have high aromatic content have comparatively higher Abbe numbers. In particular, comparing samples 2, 3 and 4, it can be seen that the use of SR348 alone results in a high Abbe number, whereas use of M1142 alone, which has a higher aromatic content, results in a low Abbe number. However, the combination of M1142 and SR348 results in a formulation that has both a low Abbe number (due to the presence of M1142) and good mechanical stability due to the presence of SR348. In particular, the Abbe number of composition 3 was calculated as about 23, whereas the Abbe number of composition 4 was calculated as about 29. Amongst these, Allnex RX15331 showed a yellow coloration when cured and is as such less preferred.

Although specific embodiments have been described, it would be apparent to the skilled person that modifications and variations are possible without departing from the spirit and scope of the invention, which is defined by the appended claims. As such, the appended claims intend to cover any such embodiments. Further, it would be apparent to the skilled person that many features described in relation to particular embodiments are combinable and envisaged for combination with features described in relation to other embodiments.

The invention claimed is:

1. A decorative structure comprising:

a support having a first planar major surface and a second planar major surface opposite the first planar major surface;

a first microstructure on the first planar major surface of the support, wherein the first microstructure comprises a plurality of grooves creating a pattern of facets, and wherein the pattern of facets comprises at least two different types of facets, wherein each different type of facet has a geometry and/or an angle of a facet plane relative to the first planar major surface of the support that differs from each other type of facet;

an at least partially reflective layer configured to at least partially reflect light that is incident on or passes through the facets; and one or more additional microstructures superimposed with the first microstructure.

2. The decorative structure of claim 1, wherein the at least partially reflective layer is a reflective or semi-transparent layer that comprises a layer of metal.

3. The decorative structure of claim 2, wherein the at least partially reflective layer is a reflective or semi-transparent layer that comprises a layer of silver and/or aluminium, or a plurality of layers of material forming a dielectric mirror.

4. The decorative structure of claim 1, wherein the plurality of grooves have a depth of between 30 μm and 3,000 μm.

5. The decorative structure of claim 1, wherein the plurality of grooves comprise two planar walls, and an angle between each of the planar walls of the grooves and the first planar major surface of the support are individually selected from between 5 and 35°.

6. The decorative structure of claim 1, wherein the plurality of grooves comprises a first set of parallel grooves and a second set of parallel grooves that at least partially intersects with the first set of parallel grooves.

7. The decorative structure of claim 6, wherein the plurality of grooves within the first set of parallel grooves are each spaced from an adjacent groove in the first set by approximately a first same distance, and wherein the plurality of grooves within the second set of parallel grooves are each spaced from an adjacent groove in the second set by approximately a second same distance.

8. The decorative structure of claim 1, wherein the first microstructure is formed from a layer of material applied on the support, and/or wherein the first microstructure is formed by imprinting the support or a layer of material applied on the support and/or wherein the first microstructure is made from a transparent material.

9. The decorative structure of claim 1, wherein the first microstructure and the one or more microstructures are separated from each other by the support and/or the at least partially reflective layer.

10. The decorative structure of claim 1, wherein the first microstructure is made from a material that is non-diffusive, and/or wherein the first microstructure is made from a material that has high optical dispersion.

11. The decorative structure of claim 1, wherein at least some of the plurality of grooves comprise or are formed from a first planar wall and a second planar wall, wherein an angle between the first planar wall and the first major planar surface of the support is different to an angle between the second planar wall and the first major planar surface of the support.

12. A decorative structure comprising:

a support having a first planar major surface and a second planar major surface opposite the first planar major surface;

a microstructure on the first planar major surface of the support, wherein the microstructure comprises a plurality of grooves creating a pattern of facets, and wherein the pattern of facets comprises at least two different types of facets, wherein each different type of facet has a geometry and/or an angle of a facet plane relative to the first planar major surface of the support that differs from each other type of facet, wherein the facets of the microstructure are planar surfaces with low surface roughness and a high degree of flatness.

13. A decorative structure comprising:

a support having a first planar major surface and a second planar major surface opposite the first planar major surface;

a microstructure on the first planar major surface of the support, wherein the microstructure comprises a plurality of grooves creating a pattern of facets, and wherein the pattern of facets comprises at least two different types of facets, wherein each different type of facet has a geometry and/or an angle of a facet plane relative to the first planar major surface of the support that differs from each other type of facet, wherein the support is made from a transparent material and/or wherein the support is a substantially flat structure.

14. A method of making a decorative structure, the method comprising:

providing a support having a first planar major surface and a second planar major surface opposite the first planar major surface; and forming a first microstructure on the first planar major surface of the support, wherein the first microstructure comprises a plurality of grooves creating a pattern of facets, wherein the pattern of facets comprises at least two different types of facets, wherein each different type of facet has a geometry and/or an angle of a facet plane relative to the first planar major surface of the support that differs from each other type of facet;

forming a second microstructure superimposed over the first microstructure; and applying an at least partially reflective layer on at least one surface selected from: the first microstructure after it is formed, the second microstructure after it is formed, the first planar major surface of the support prior to forming the first microstructure, and/or the second planar major surface of the support.

15. A method of making a decorative structure, the method comprising:

providing a support having a first planar major surface and a second planar major surface opposite the first planar major surface; and forming a microstructure on the first planar major surface of the support, wherein the microstructure comprises a plurality of grooves creating a pattern of facets, wherein the pattern of facets comprises at least two different types of facets, wherein each different type of facet has a geometry and/or an angle of a facet plane relative to the first planar major surface of the support that differs from each other type of facet, wherein forming a microstructure comprises applying a layer of imprintable material and imprinting a microstructure into the layer of imprintable material using a stamp.

16. The method of claim 15, further comprising providing a metallic master stamp, wherein providing a metallic master stamp comprises creating a plurality of substantially triangular grooves in a metal substrate using a monocrystalline diamond cutting tool.

17. A decorative structure comprising:

a support having a first planar major surface and a second planar major surface opposite the first planar major surface;

a microstructure on the first planar major surface of the support, wherein the microstructure comprises a plurality of grooves creating a pattern of facets, and wherein the pattern of facets comprises at least two different types of facets, wherein each different type of facet has a geometry and/or an angle of a facet plane relative to the first planar major surface of the support that differs from each other type of facet, wherein the plurality of grooves are triangular and have a depth of between 50 and 150 μm.

18. A decorative structure comprising:

a support having a first planar major surface and a second planar major surface opposite the first planar major surface;

a microstructure on the first planar major surface of the support, wherein the microstructure comprises a plurality of grooves creating a pattern of facets, and wherein the pattern of facets comprises at least two different types of facets, wherein each different type of facet has a geometry and/or an angle of a facet plane relative to the first planar major surface of the support that differs from each other type of facet, wherein the plurality of grooves comprises a first set of parallel grooves and a second set of parallel grooves that at least partially intersects with the first set of parallel grooves, wherein the plurality of grooves comprises a third set of parallel grooves that at least partially intersects with the first and second sets of parallel grooves.

* * * * *